US 12,450,430 B2

United States Patent
Mao et al.

(10) Patent No.: US 12,450,430 B2
(45) Date of Patent: Oct. 21, 2025

(54) AUTOMATED IDENTIFICATION OF SENTENCE CONCRETENESS AND CONCRETENESS CONVERSION

(71) Applicant: INTERNATIONAL BUSINESS MACHINES CORPORATION, Armonk, NY (US)

(72) Inventors: Xiao Xia Mao, Shanghai (CN); Jialei Ma, Shanghai (CN); Nan Nan Li, Shanghai (CN); Min Huang, Shanghai (CN); Xiao Feng Ji, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 18/184,016

(22) Filed: Mar. 15, 2023

(65) Prior Publication Data
US 2024/0311561 A1    Sep. 19, 2024

(51) Int. Cl.
*G06F 40/253*    (2020.01)
*G06F 40/166*    (2020.01)
*G06F 40/30*    (2020.01)

(52) U.S. Cl.
CPC .......... *G06F 40/253* (2020.01); *G06F 40/166* (2020.01); *G06F 40/30* (2020.01)

(58) Field of Classification Search
CPC ...... G06F 40/253; G06F 40/166; G06F 40/30; G06F 40/56
See application file for complete search history.

(56) References Cited

U.S. PATENT DOCUMENTS

| | | |
|---|---|---|
| 8,145,636 B1 | 3/2012 | Jeh |
| 8,744,855 B1 * | 6/2014 | Rausch ................. G09B 19/06 434/156 |
| 9,025,607 B2 * | 5/2015 | Zeger .................. H04L 12/1886 370/400 |
| 9,720,981 B1 * | 8/2017 | Boguraev ............. G06F 16/683 |
| 11,947,916 B1 * | 4/2024 | Agarwal ................ G06N 20/00 |
| 2007/0168413 A1 | 7/2007 | Barletta |

(Continued)

FOREIGN PATENT DOCUMENTS

WO    2022015730 A1    1/2022

OTHER PUBLICATIONS

IBM, "Watson Natural Language Understanding," IBM.com, Accessed: Jan. 4, 2023, https://www.ibm.com/uk-en/cloud/watson-natural-language-understanding, 7 pages.

(Continued)

*Primary Examiner* — Darioush Agahi
(74) *Attorney, Agent, or Firm* — Caleb D. Wilkes

(57) ABSTRACT

A method, computer system, and a computer program product for text corpus concreteness modification are provided. A computer performs natural language processing to determine a concreteness level of a first individual sentence of a text corpus. The computer generates, based on the natural language processing, a proposed change of the individual sentence. The individual sentence with the proposed change includes a modified concreteness level and preserves a general meaning of the individual sentence. The computer transmits the proposed change for presentation of the proposed change.

20 Claims, 15 Drawing Sheets

(56) References Cited

U.S. PATENT DOCUMENTS

| | | | | |
|---|---|---|---|---|
| 2015/0332673 | A1* | 11/2015 | Li | G06F 40/30 |
| | | | | 704/235 |
| 2016/0140210 | A1* | 5/2016 | Pendyala | G06F 40/205 |
| | | | | 707/737 |
| 2017/0109354 | A1 | 4/2017 | Boxwell | |
| 2019/0354590 | A1 | 11/2019 | Popescu | |
| 2020/0218778 | A1* | 7/2020 | Abuelsaad | G06F 40/205 |
| 2020/0225970 | A1* | 7/2020 | Mohanta | G06F 9/45558 |
| 2020/0364303 | A1 | 11/2020 | Liu | |
| 2021/0056456 | A1* | 2/2021 | Kawas | G06F 17/18 |
| 2023/0061773 | A1* | 3/2023 | Patil | G06F 40/30 |
| 2023/0124354 | A1* | 4/2023 | Akahori | G06F 40/30 |
| | | | | 704/9 |
| 2024/0104131 | A1* | 3/2024 | Tambi | G06F 40/289 |

OTHER PUBLICATIONS

Wikipedia, "Convolutional neural network," Wikipedia—The Free Encyclopedia, Accessed: Jan. 4, 2023, https://en.wikipedia.org/wiki/Convolutional_neural_network, 37 pages.

Wikipedia, "Gibbs sampling," Wikipedia—The Free Encyclopedia, Accessed: Jan. 4, 2023, https://en.wikipedia.org/wiki/Gibbs_sampling, 9 pages.

Wikipedia, "Latent Dirichlet allocation," Wikipedia—The Free Encyclopedia, Accessed: Jan. 4, 2023, https://en.wikipedia.org/wiki/Latent_Dirichlet_allocation, 8 pages.

\* cited by examiner

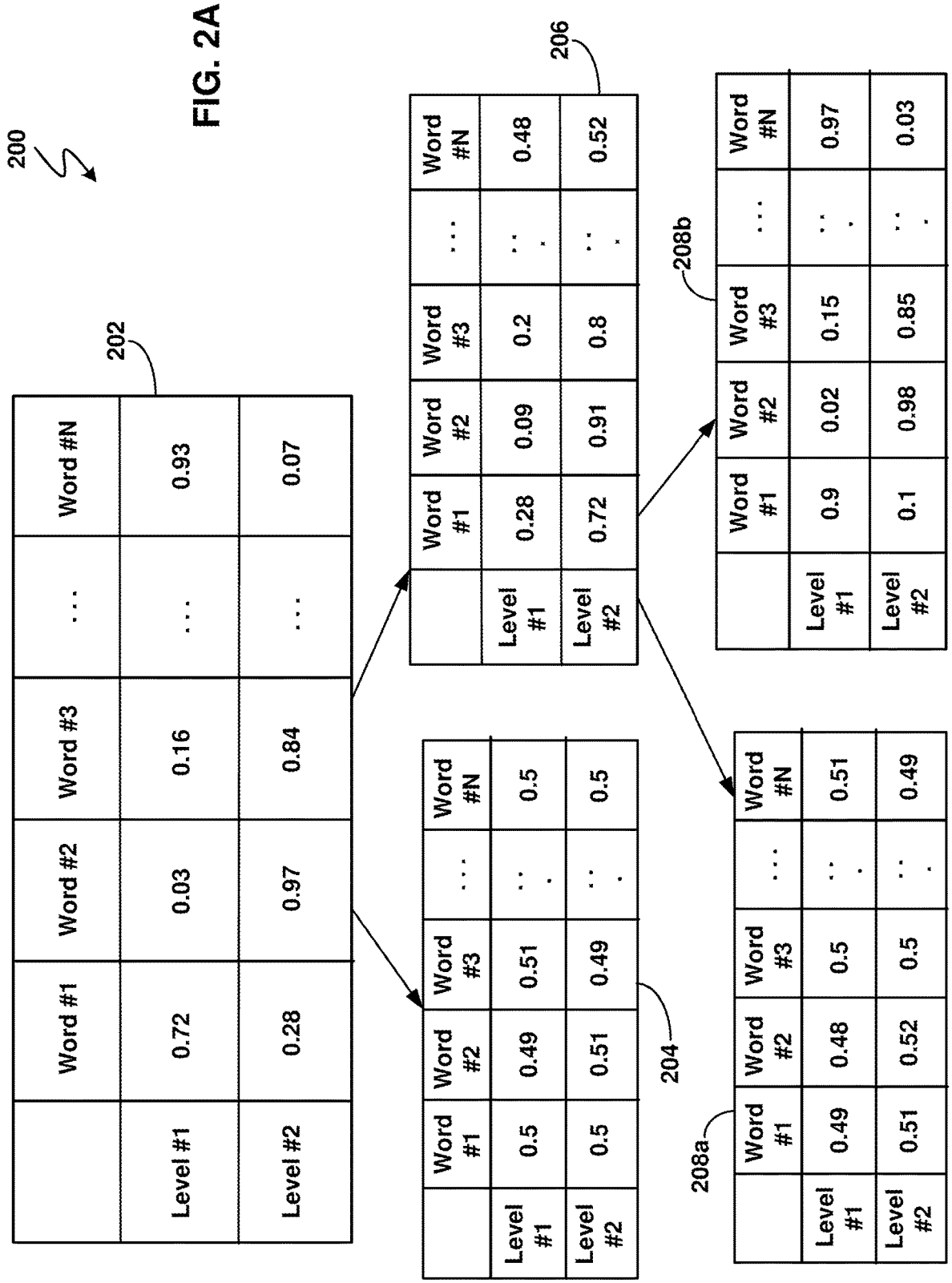

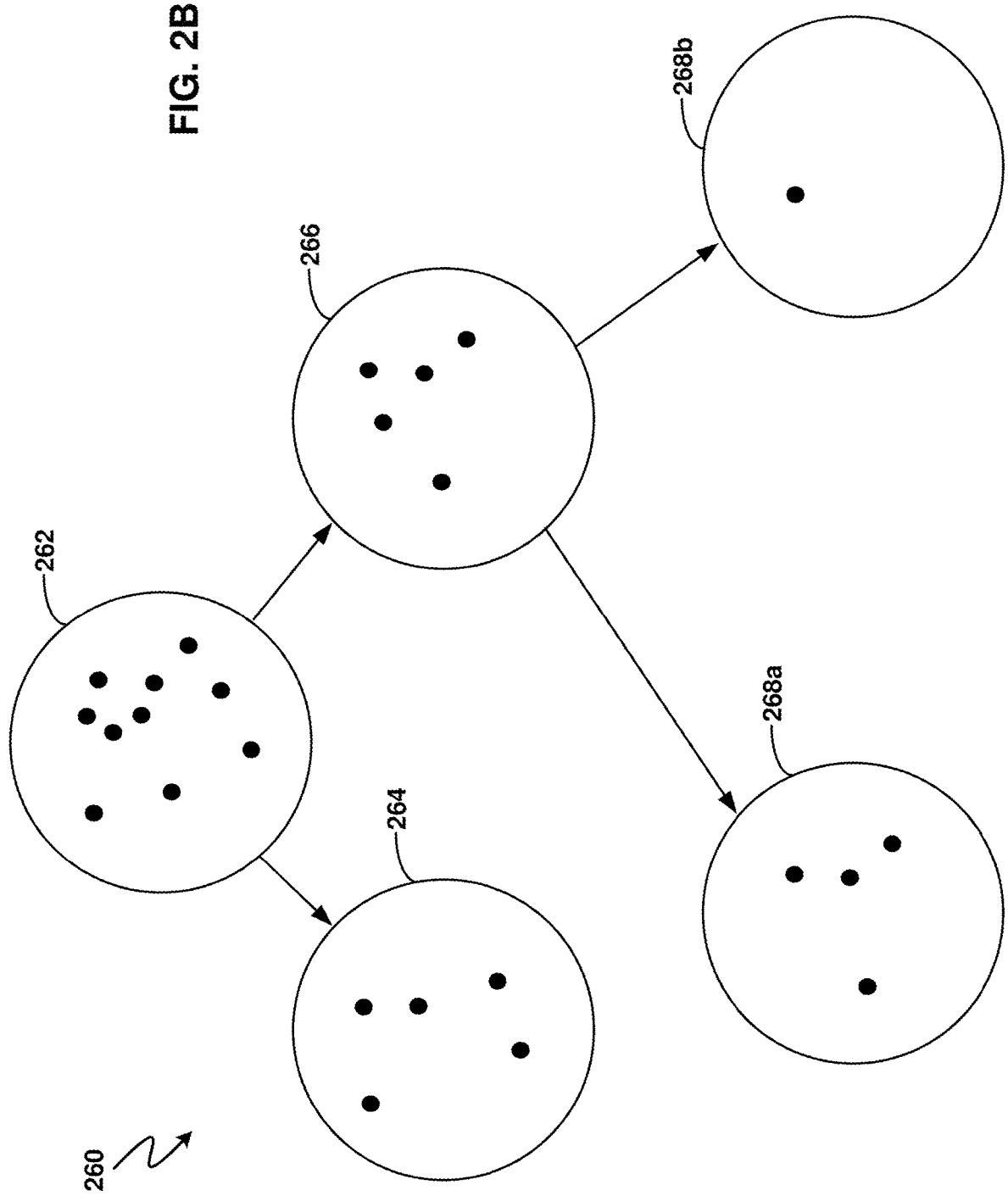

$$Q^{G_\theta}(s = Y_{1:t-1}, a = y_t) = \begin{cases} \frac{1}{N}\sum_{n=1}^{N}\left(\lambda_1 * D_\phi(Y_{1:T}^n) + \lambda_2 * C_\varphi(Y_{1:T}^n, \mathbb{S}) + \lambda_3 * Cosine(G_\theta(Y_{1:T}^n), \mathbb{S}_{src}) + \lambda_4 * \mathcal{M}(Y_{1:T}^n, \mathbb{I})\right), Y_{1:T}^n \in MC^{G_\beta}(Y_{1:t}; N) & \text{for } t < T \\ \lambda_1 * D_\phi(Y_{1:t}) + \lambda_2 * C_\varphi(Y_{1:t}, \mathbb{S}) + \lambda_3 * Cosine(G_\theta(Y_{1:t}), \mathbb{S}_{src}) + \lambda_4 * \mathcal{M}(Y_{1:t}, \mathbb{I}) & \text{for } t = T \end{cases}$$

AUTOMATED IDENTIFICATION OF SENTENCE CONCRETENESS AND CONCRETENESS CONVERSION

BACKGROUND

The present invention relates generally to the fields of automated document and text analysis, software for automatically generating document editing suggestions, and natural language processing that involves machine learning models and word embeddings.

SUMMARY

According to one exemplary embodiment, a method for text corpus concreteness modification is provided. A computer performs natural language processing to determine a concreteness level of a first individual sentence of a text corpus. The computer generates, based on the natural language processing, a proposed change of the individual sentence. The individual sentence with the proposed change includes a modified concreteness level and preserves a general meaning of the individual sentence. The proposed change is transmitted for presentation of the proposed change. A computer system and computer program product corresponding to the above method are also disclosed herein.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 2A illustrates aspects of a concreteness-level classification tree according to at least one embodiment and used in the automated concreteness conversion process and pipeline shown in FIGS. 1A and 1B, respectively;

FIG. 2B illustrates a sentence dot tree that correlates to the classification tree shown in FIG. 2A;

FIG. 8C shows an action-value function of a sequence used for training the concreteness conversion generator shown in FIG. 6B.

DETAILED DESCRIPTION

Figure 1A:
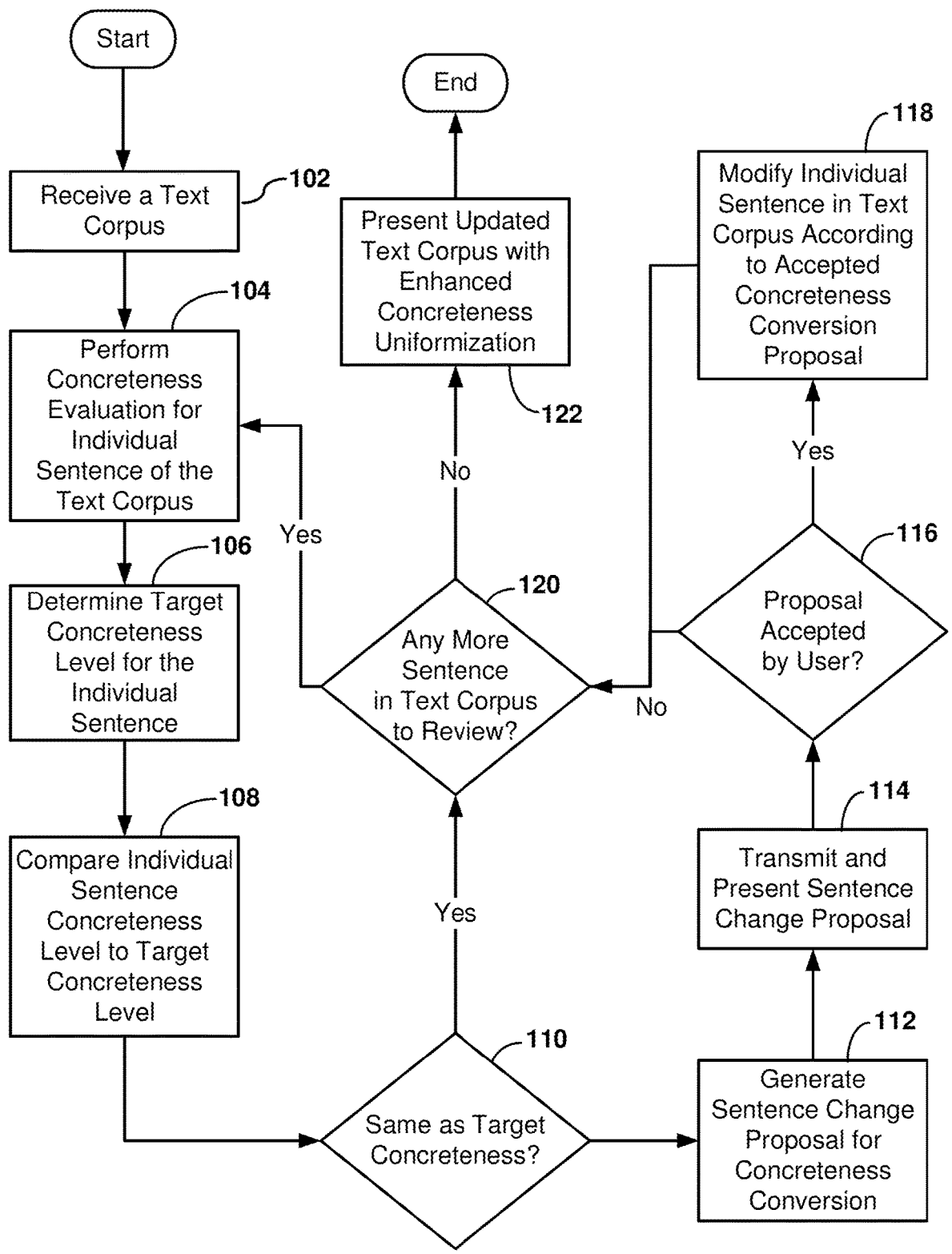
FIG. 1A is an operational flowchart illustrating a process for automated concreteness conversion for sentences according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a system, a method, and a computer program product for automated concreteness conversion for sentences and for assisting with text corpus concreteness uniformization. The present embodiments enhance automated document and text analysis and software for automatically generating and implementing document editing suggestions. The "concreteness" terminology used in the present embodiments refers to a level of detail in a particular sentence and/or in a group of sentences in a text corpus. The level of detail may be indicated by a number and quality of subjects, objects, verbs, prepositional phrases, adjectives, and clauses of a sentence which provide additional information.

When a text corpus such as a document and/or a report is written, the content might be presented with an unexpected and/or undesired level of concreteness for one, some, or all of the sentences of the text corpus. For example, one, some, or all of the sentences of the text corpus are too general or are too detailed. If a text corpus has insufficient details, then the reader has to do extraneous research to understand the content. Such extraneous research might be time and resource consuming. For example, the following two sentences that describe performance requirements for an application programming interface ("API") have different concreteness levels and, therefore, different impact:

"The API responds sufficiently fast."
"The API responds within one second."

The first sentence has a general level of detail, so that the reader would have to do more reading and/or more research in order to better understand the particular performance and the particular speed of the API. The second sentence has a higher concreteness level than the first sentence has. The detail of the second sentence includes a specific response time of the API. This specific response time might be deemed a more appropriate concreteness level for guiding the reader in performing precision tests regarding the assertion.

The present embodiments include text analysis software automatically evaluating the concreteness level of one or more sentences of a text corpus and then, in an automated manner, providing change suggestions for particular sentences to improve their concreteness level while preserving a general meaning of the sentence. The present embodiments harness natural language processing and machine learning in order to perform this analysis of the current concreteness, a target concreteness (e.g., a desired concreteness level) based on input factors and/or text corpus context, and sentence change proposing.

The present embodiments also provide benefits in situations in which multiple authors have contributed to and/or edited the same document. Due to different writing styles for the respective authors, the concreteness level might vary throughout the single document. This variation may cause the quality of the document to be deemed as lower and may cause the document to be considered as inconsistent. For example, when describing the same instruction in the same test case, three different users who are together helping draft a document might provide three different sentences, respectively, each with a different respective concreteness level as follows:

(1) "Log into the system with your account."
(2) "Enter your username and password in the login window to log into the system."
(3) "In the login window, type your username and password in the first and second textboxes respectively and then click on the 'Submit' button."

The first instruction (1) has the lowest concreteness level. The second instruction (2) has an increased concreteness level compared to the first instruction, because "username" and "password" provide more specific examples that represent what the "account" is that is referred to in the first instruction. The second sentence provides in the prepositional phrase "in the login window" more specific instructions about a location for providing the information. The third instruction (3) has an increased concreteness level compared to both the first instruction and to the second instruction. The third instruction (3) includes not only the "username" and "password" details from the second instruction, but also includes in an additional prepositional phrase further location details of "first and second textboxes". The third instruction (3) also is a compound sentence with multiple imperative portions, and the second imperative portion provides additional detail instructions of a new action verb ("click") for the user to perform and another prepositional phrase ("on the Submit button") which provides a location for where the new action should be performed. This second imperative portion provides details that are not present in the second instruction (2) of how to engage with the "Submit button". The third instruction (3) has a greater concreteness level than the second instruction (2) has due to additional details provided about how to log into the system. The difference in concreteness levels for the third instruction (3) compared to the first instruction (1) is greater than the difference in concreteness levels for the third instruction (3) compared to the second instruction (2).

The present embodiments provide a system, a method, and a computer program product which allow a document to be automatically evaluated for an overall concreteness level and for a concreteness level of sub-portions of a document. The present embodiments facilitate automated identification of concreteness inconsistencies throughout a single document and automated suggestion of concreteness changes for particular document portions such as a sentence in order to achieve an overall improved text corpus concreteness uniformization. The present embodiments may be implemented in automated document and text analysis software.

The present embodiments include features that allow a concreteness level of a sentence to be automatically inferred and/or evaluated via software such as document editing software and using artificial intelligence and machine learning. The present embodiments include converting a sentence with one concreteness level to another sentence expressing the same general meaning but with a different concreteness level. The present embodiments also may include additional features such as building a concreteness-level classification tree through continuous dichotomy in order to determine the total number of concreteness levels of sentences that belong to a given semantic category. The present embodiments also may include the automatic evaluation of concreteness level of a sentence by passing the sentence through a concreteness-level classification tree in an automated manner. The present embodiments also may include generating and using a trained text generation model that is based on deep learning, that receives, as inputs, a sentence and a target concreteness level, and, in response, produces as an output a sentence having the same general meaning but with a modified concreteness level, i.e., with an increased or decreased concreteness level to better approach a target concreteness level.

In at least some embodiments, different sentences express generally the same semantic meeting but with a different respective concreteness level according to a level of detail provided and/or expressed to indicate that semantic meaning. When the present embodiments are employed in text editor software, the respective concreteness levels of one, some, or all of the sentences of the text corpus, e.g., document, will be analyzed automatically. If a sentence has a concreteness level that is different from the overall concreteness level of the context, the text editor software may indicate this identification and prompt the user to accept and/or reject the suggestion. Upon acceptance, the enhanced text editor software may modify the text corpus to replace the original sentence with the modified suggestion.

For a target sentence, the present embodiments may include identifying a latent semantic category of a sentence by using semantic classification technology, natural language processing, and machine learning. This identification may occur firstly in the backend. Then, the concreteness level of the target sentence may be inferred after passing the sentence through a pre-built concreteness-level classification tree of the identified semantic category. If the concreteness level of the sentence is different from the overall concreteness level of other sentences in the same text corpus, a concreteness-level conversion generator will take in both the target sentence and the overall concreteness level and then generate a counterpart sentence expressing the same semantic meaning but with the revised concreteness level that better matches the overall text corpus concreteness level. The enhanced text editor software may include a classification tree and a concreteness conversion generator.

Figure 9:
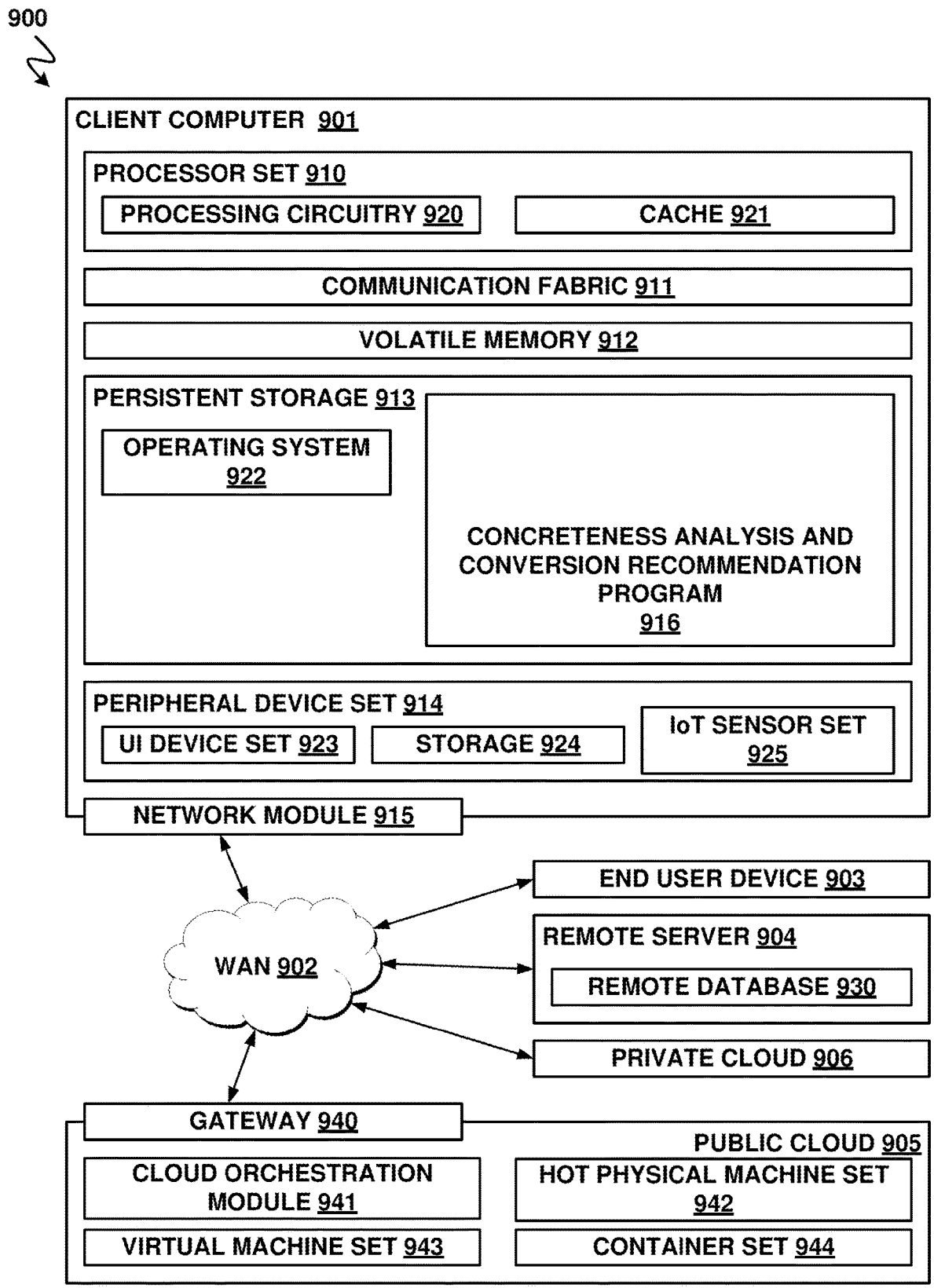
FIG. 9 illustrates a networked computer environment in which automated concreteness conversion for sentences, concreteness-level tree generation, and/or concreteness-modification machine learning model training may be implemented according to at least one embodiment.

FIG. 1A illustrates an operational flowchart illustrating a concreteness analysis and uniformization process 100 for automated concreteness conversion for sentences and a text corpus according to at least one embodiment. The concreteness uniformization process may be carried out via software, e.g., via the concreteness analysis and conversion recommendation program 916 shown as being stored on the client computer 901 shown in FIG. 9. Thus, a user using the computer 901 for analyzing a document may actuate this concreteness analysis and conversion recommendation program 916 to enhance the concreteness uniformization of a text corpus, e.g., document, being hosted and/or displayed at the computer 901. The concreteness analysis and conversion recommendation program 916 may in some embodiment be couched as a set of editing features in an overall text editing program.

In step 102 of the concreteness analysis and uniformization process 100 shown in FIG. 1, a text corpus is received. The receiving of step 102 may occur via a user opening in editing software a stored electronic text document that was previously generated and stored in memory of a computer or of a remote server. The receiving of step 102 may occur via a user typing and/or speaking into a microphone connected to a computer with speech-to-text transcription natural language processing software to generate a text corpus that is presented to the concreteness analyzation program. The receiving of step 102 may occur when a user activates concreteness evaluation features with a text open within text editing software. The receiving of step 102 may also involve a user uploading the text corpus as a file into a web portal of/for the program for concreteness analysis and conversion recommendation program 916. The concreteness analysis and conversion recommendation program 916 may receive access to the text corpus in any equivalent fashion. A user may load such a file into a web portal via a computer such as the client computer 901 or via an end user device 903 that communicates via a communication network such as the wide area network 902 with the computer 901 that hosts the concreteness analysis and conversion recommendation program 916. The receiving may occur via the concreteness analysis and conversion recommendation program 916 receiving an uploaded file at a computer and/or server. Such file may be transmitted via a network such as the WAN 902 shown in FIG. 9.

In some embodiments the step 102 may include the concreteness analysis and conversion recommendation program 916 performing automated web crawling to gather one or more text corpuses. In some embodiments the step 102 may include the concreteness analysis and conversion recommendation program 916 performing optical character recognition on a scanned image of one or more text corpuses in order to generate machine-editable and machine-searchable text data that is stored in temporary memory and/or permanent computer memory belonging to, adjacent to, and/or accessible to the concreteness analysis and conversion recommendation program 916. The receiving of the text corpus in step 102 in various forms of receiving encompasses the concreteness analysis and conversion recommendation program 916 receiving and/or producing machine-editable and machine-searchable text data that constitutes the text corpus. This text data may be stored in temporary computer memory and/or permanent memory belonging to, adjacent to, and/or accessible to the concreteness analysis and conversion recommendation program 916.

In step 104 of the concreteness analysis and uniformization process 100 shown in FIG. 1, a concreteness evaluation for an individual sentence of the text corpus is performed. This individual sentences is from the text corpus that was received in step 102. The concreteness evaluation produces a concreteness level for the individual sentence that is analyzed. This concreteness level in at least some embodiments is a scalar number such as 1, 2, 3, 4, 5, etc.

Figure 1B:
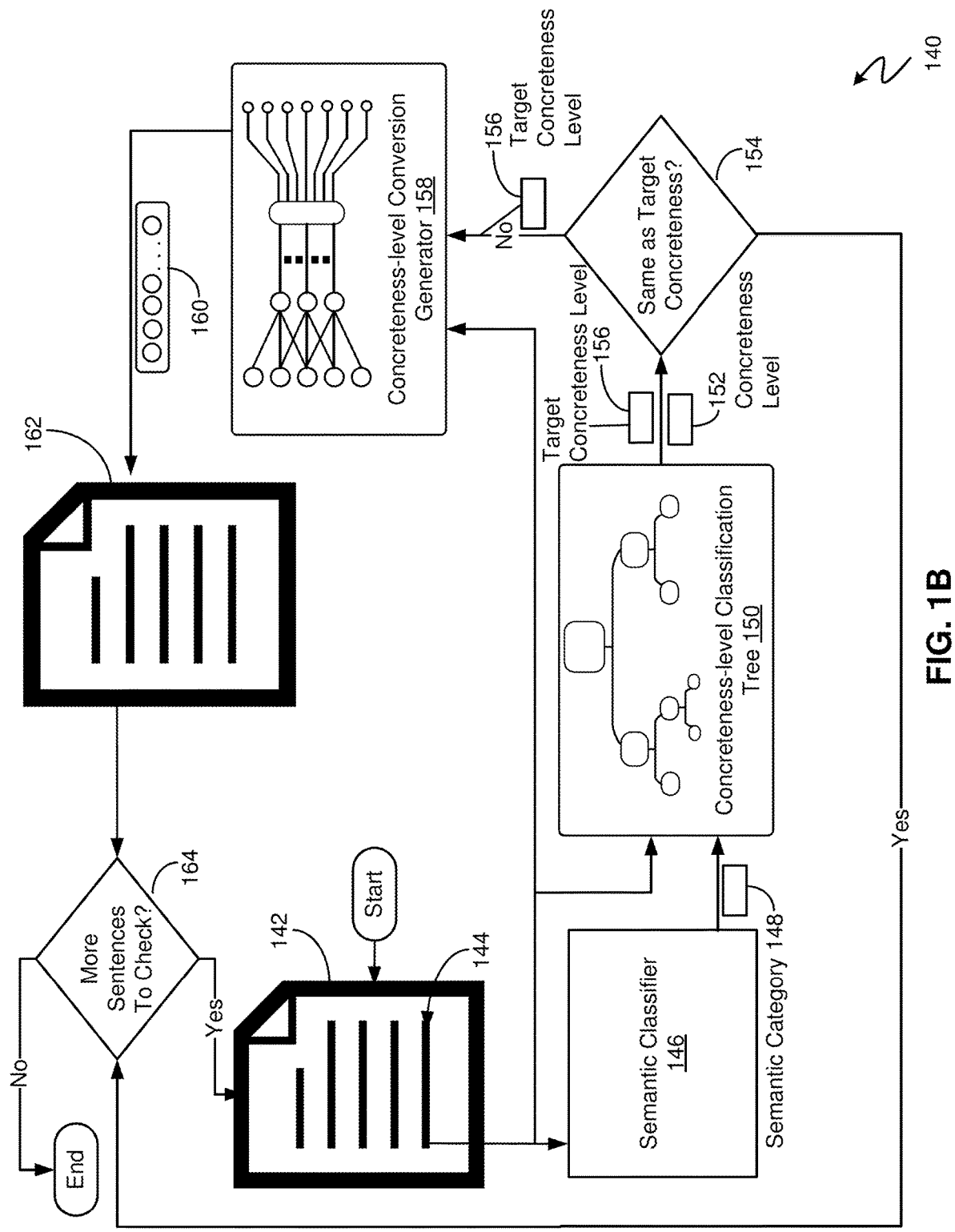
FIG. 1B illustrates a pipeline according to at least one embodiment for the process for automated concreteness conversion for sentences shown in FIG. 1A.

This concreteness evaluation in at least some embodiments is performed using a concreteness-level classification tree such as the concreteness-level classification tree 150 shown in the pipeline of FIG. 1B. The concreteness-level classification tree may be part of the concreteness analysis and conversion recommendation program 916. The concreteness-level classification tree may be pre-generated based on analysis of prior text electronic documents and/or may be generated based on analysis of multiple sentences of the current text corpus whose sentence is being analyzed. The generation of and use of a concreteness-level classification tree is shown in FIGS. 2A-5 and is described in the present disclosure in the corresponding description of these drawings.

In at least some embodiments, the concreteness-level classification tree requires as input the individual sentence and a semantic category, e.g., a latent semantic category, of the individual sentence. Therefore, the individual sentence in at least some embodiments is input into a semantic classifier such as the semantic classifier 146 shown in FIG. 1B in order to generate a semantic category which is subsequently input into the concreteness-level classification tree. The semantic classifier may be part of and/or accessible to the concreteness analysis and conversion recommendation program 916. The concreteness-level classification tree in such embodiments is organized according to semantic topic and/or category. The structure and performance of the semantic classifier 146 is described below for the description of the pipeline of FIG. 1B.

In step 106 of the concreteness analysis and uniformization process 100 shown in FIG. 1, a target concreteness level for the individual sentence is determined. This individual sentence is that individual sentence that was analyzed in step 104 for its own current concreteness level. The target concreteness level is determined via the concreteness analysis and conversion recommendation program 916 based on user input and/or output of the concreteness-level classification tree. The target concreteness level in at least some embodiments is a scalar number such as 1, 2, 3, 4, 5, etc.

In some embodiments, a user may indicate to the concreteness analysis and conversion recommendation program 916 (via input/output device actuation that engages with a graphical and/or audible user interface input/output portion of a user interface of the concreteness analysis and conversion recommendation program 916) to engage a setting in which suggestions for improving concreteness of many, most, or all sentences of a text corpus of a document to be analyzed are generated by the concreteness analysis and conversion recommendation program 916. The user may set a minimum concreteness level with the concreteness analysis and conversion recommendation program 916, and any sentence of the text corpus which does not reach the minimum concreteness level may be flagged as needing a concreteness change proposal. The target concreteness level may be a minimum set level or may be the evaluated level plus one. If a minimum level is set, then the target concreteness level is the minimum level. For example, if the minimum level is set as concreteness level three then all sentences evaluated to have a concreteness level of one or two will be set with a target concreteness level of three. If a document universal concreteness increasing policy is set, then the target concreteness level will be the determined level plus one. For example, if the step 104 produced a concreteness level of two for an individual sentence, then in step 106 the target concreteness level would be two plus one, i.e., three.

In some embodiments, a target concreteness level for an individual sentence is based on the semantic category of the individual sentence. The concreteness analysis and conversion recommendation program 916 may determine a target concreteness level for an individual sentence based on an analysis of the concreteness levels of other sentences from the same semantic category. The other sentences from the same semantic category may be exclusively from those sentences within the current text corpus being analyzed. The other sentences from the same semantic category may additionally include sentences within prior documents that were used to train and build the concreteness-level classification tree. In some instances, a majority concreteness level of sentences within the semantic category is used as the target concreteness level for that sentence. For example, if four sentences from semantic category A are concreteness level 2, one sentence from semantic category A has concreteness level 1, and one sentence from semantic category A has concreteness level 3, then "2" is taken as the target concreteness level for all sentences from semantic category A. The sentences within a particular semantic category may be exclusively from the text corpus that is currently being analyzed. Alternatively, those sentences from same semantic category and from the currently analyzed text corpus may be supplemented by sentences from historical documents that also belong to that semantic category.

If no clear majority concreteness level exists for the current document alone or inclusive of historical sentences, the concreteness analysis and conversion recommendation program 916 may generate a prompt to ask the user for a target concreteness level for the particular sentence and/or the sentences of a particular semantic category. The user may then provide input to the concreteness analysis and conversion recommendation program 916 which is used as the target concreteness level. In another embodiment, the concreteness analysis and conversion recommendation program 916 automatically selects one concreteness level as a target/desired level. This selection may be random and/or based on concreteness levels, e.g., a majority concreteness level, of sentences from other semantic categories from the same text corpus being analyzed or supplemented by sentences from historical documents that were used to train and/or generate the concreteness-level classification tree.

In step 108 of the concreteness analysis and uniformization process 100 shown in FIG. 1, respective individual sentence concreteness level of a sentence of the text corpus is compared to the overall text corpus concreteness level. This comparison is performed with respect to (1) the concreteness level determined in step 104 and (2) the target concreteness level determined in step 106. For those embodiments where the concreteness levels are scalar numbers, the step 108 may be performed via a comparator of the concreteness analysis and conversion recommendation program 916. The comparator may indicate that the two concreteness levels being compared are equal or that one is larger than the other.

In step 110 of the concreteness analysis and uniformization process 100 shown in FIG. 1, a determination is made as to whether the individual sentence concreteness level is the same as target concreteness level. If the determination is affirmative and the individual sentence concreteness level is the same as the target concreteness level, then the concreteness analysis and uniformization process 100 proceeds to step 120 without generating any concreteness modification suggestion for that sentence that is being analyzed. Via this branch to step 120, the concreteness analysis and uniformization process 100 may loop back for concreteness analysis of one or more other sentences of the text corpus. If the determination is negative and the individual sentence concreteness level is different from the target concreteness level, then the concreteness analysis and uniformization process 100 proceeds to step 112. For those embodiments where the concreteness levels are scalar numbers, the step 110 may be performed via a comparator of the concreteness analysis and conversion recommendation program 916. The comparator may indicate that the two concreteness levels being compared are equal or that one is larger than the other.

In step 112 of the concreteness analysis and uniformization process 100 shown in FIG. 1, a sentence change proposal for concreteness conversion is generated. This sentence change proposal is for the individual sentence whose concreteness was evaluated in step 104. The sentence change proposal attempts to change that individual sentence to have the target concreteness level that was determined in step 106. This sentence change proposal seeks to make the concreteness level change while also preserving a general meaning of the sentence. Thus, with the changed sentence the same general meaning is expressed but with a greater or lesser level of detail. This sentence change proposal is generated in an automated manner via the concreteness analysis and conversion recommendation program 916. In at least some embodiments, a concreteness-level conversion generator such as the concreteness-level conversion generator 158 shown in the pipeline of FIG. 1B produces the sentence change proposal of step 112. This concreteness-level conversion generator may be a machine learning model which is trained to receive a sentence and a target concreteness level as inputs and in response to produce a modified sentence with the target concreteness level as an output. This concreteness-level conversion generator may be part of the concreteness analysis and conversion recommendation program 916. Examples and details of the training of the concreteness-level conversion generator are shown in FIGS. 6A to 8B of the drawings and the corresponding description of these drawings in the present disclosure. Examples and details of performance of the concreteness-level conversion generator are shown in FIG. 1B and the corresponding description of the concreteness-level conversion generator 158.

In step 114 of the concreteness analysis and uniformization process 100 shown in FIG. 1, the sentence change proposal is transmitted and presented. This sentence change proposal refers to the sentence change proposal that was generated in step 112. This transmission may be within the computer such as the computer 901. This internal transmission may occur starting from the concreteness analysis and conversion recommendation program 916 in the persistent memory storage 913 of the computer 901 and traveling on an internal bus of the computer 901 to the peripheral device set 914 which presents the sentence change proposal. This presentation may occur visually via a display screen of the computer 901. This presentation may additionally and/or alternatively occur audibly via an audio speaker connected to the computer 901. Such display screen and/or audio speaker may be part of the UI device set 923 of the computer 901.

For example, the presentation may occur visually, within a visual display of the text corpus within the document editing software, via highlighting the sentence with a particular color that is different from the other background shown behind the text corpus, e.g., the white paper screen shown behind the text corpus. In some instances, a graphic such as a graphic sidebar may be generated that visually displays the identified sentence having a different concreteness level. The rest of the text corpus may be displayed in all or most remaining areas of the screen besides the graphic, e.g., besides the graphic sidebar. Such suggestion may be visually displayed via a graphical pop-out text box if a cursor, which is controlled by the user, hovers on the display screen over a highlighted sentence.

In step 116 of the concreteness analysis and uniformization process 100 shown in FIG. 1, a determination is made as to whether the user accepts the proposal. If the determination is affirmative and the proposal is accepted by the user, then the concreteness analysis and uniformization process 100 proceeds to step 118. If the determination is negative and the proposal is rejected and/or not accepted by the user, then the concreteness analysis and uniformization process 100 proceeds to step 120. Both of these two branches eventually lead to step 120 for a check if there are more sentences in the text corpus to be reviewed for potential concreteness level modification.

The presentation whether visually and/or audibly may include for step 116 generation and presentation of a prompt asking a user if the user would like to adopt the suggestion. The user may respond via engaging an input tool such as a keyboard and/or a mouse to engage a text box on the display screen to indicate suggestion acceptance or rejection. The user may click on an "accept suggestion" action button, a "skip suggestion" action button, a "reject suggestion" action button, etc. The user may respond via speaking into a microphone connected to the computer and the enhanced text editing software may perform speech-to-text transcription and natural language processing of the verbal response in order to understand the suggestion acceptance or rejection provided by the user. The user may audibly speak the word "accept" or "reject" or "yes" or "no" to respond to the prompt.

In step 118 of the concreteness analysis and uniformization process 100 shown in FIG. 1, the individual sentence is modified in the text corpus according to the accepted concreteness conversion proposal. Accepting the suggestion may cause the concreteness analysis and conversion recommendation program 916 to automatically replace the original sentence with the suggested modified sentence with the modified concreteness level but that maintains the general meaning of the sentence. The concreteness analysis and conversion recommendation program 916 may be a sub-module of regular document editing software or have an application programming interface connection with the regular document editing software. The program 916 may revise the text corpus that appears in the regular document editing software to replace the original sentence with the modified sentence.

In instances where the suggested sentence included an increased level of concreteness, i.e., detail, the concreteness modification program may generate placeholders for some specific terms like numbers, dates, and/or times which signal to the user to manually provide the more-detailed information at that placeholder location. Thus, this embodiment prompts the user to themselves produce some additional detail to increase the concreteness level. In other instances, the concreteness analysis and conversion recommendation program 916 may crib details from other sentences within the same semantic category to produce the additional details for adding to the original sentence to increase the concreteness level.

In step 120 of the concreteness analysis and uniformization process 100 shown in FIG. 1, a determination is made as to whether any more sentence in the text corpus is to be reviewed. If the determination is affirmative and there is another sentence in the text corpus for the program to review, then the concreteness analysis and uniformization process 100 proceeds to step 104 for a repeat of steps 104, 106, 108, 110, and 120 and for some, all, or none of steps 112, 114, 116, and 118 with respect to the additional sentence to be reviewed. If the determination is negative and there is no more sentence in the text corpus to review, then the concreteness analysis and uniformization process 100 proceeds to step 122.

The concreteness analysis and conversion recommendation program 916 may proceed sentence by sentence through all or some of the text corpus with the concreteness evaluations of the concreteness analysis and uniformization process 100. The concreteness analysis and conversion recommendation program 916 may determine that no more sentence is available and/or needed to review once the concreteness analysis and conversion recommendation program 916 reaches a last sentence of the text corpus that is being highlighted. The concreteness analysis and conversion recommendation program 916 may determine whether a user requested for all of the sentences of a text corpus to be analyzed or if just a sub-portion, e.g., a highlighter portion, of a text corpus is to be analyzed via the concreteness analysis and uniformization process 100. If just a sub-portion of a text corpus is to be analyzed, the step 120 may recognize that no more sentence is to be reviewed by reaching an end of the highlighted portion of the text corpus.

In step 122 of the concreteness analysis and uniformization process 100 shown in FIG. 1, the updated text corpus with enhanced concreteness uniformization is presented to the user. The presentation may occur visually, within a visual display of the text corpus within the document editing software, on a display screen of the computer such as the computer 901. In some instances, the presentation of step 122 may occur with a graphic, such as a graphic sidebar, regarding sentence concreteness level analysis having been removed. In some embodiments, the presentation of step 122 may occur additionally and/or alternatively in an audible manner being played audibly over audio speakers connected to the computer such as the computer 901.

The concreteness analysis and uniformization process 100 may end after step 122. After ending of this iteration, the concreteness analysis and uniformization process 100 may subsequently be repeated for concreteness analysis of other text corpuses.

FIG. 1B illustrates a concreteness analysis and conversion pipeline 140 which shares content, features, and steps with the concreteness analysis and uniformization process 100 shown in FIG. 1A but illustrates the components in a chain of processing elements. The concreteness analysis and conversion pipeline 140 shows a pipeline process with modules, machine learning models, computer elements, and/or steps which illustrate certain features of the concreteness analysis and uniformization process 100. Some or all of the modules, machine learning models, and/or computer elements may be part of the concreteness analysis and conversion recommendation program 916.

The concreteness analysis and conversion pipeline 140 starts with a first text corpus 142 that includes multiple sentences being input to and/or accessed by the concreteness analysis and conversion recommendation program 916. FIG. 1B shows the first text corpus 142 including multiple sentences and a first submitted sentence 144 that is submitted to the concreteness analysis and conversion recommendation program 916 for concreteness evaluation and potential modification. The concreteness analysis and conversion pipeline 140 includes the inputting of the first submitted sentence 144 into a semantic classifier 146 which in response produces as output a semantic category 148 for the first submitted sentence 144. The semantic category may refer to a first level topic of the text corpus or to a second level topic (sub-topic) that belongs to a first level topic.

In at least some embodiments, the semantic classifier performs semantic classification of a particular sentence such as the first submitted sentence 144 by performing topic modeling natural language processing on the entire text corpus to which the submitted sentence belongs and/or further semantic classification within a particular topic. Instead of analyzing the sentences of the current text corpus alone for topic modeling, the topic modeling in some embodiments may incorporate sentences, words, and analysis from other historical documents which were previously analyzed by the semantic classifier 146. The topic modeling may break down the text corpus(es) into a specified number of topics.

The number of topics may be pre-determined according to a number of latent topics based on real-world application scenarios. In some embodiments a number of topics may be determined with natural language processing performed by the semantic classifier 146 on the text corpus(es) such as by performing a hierarchical dirichlet process, computing a topic coherence for a number of different topics and selecting the model which gives a highest topic coherence, and/or performing perplexity and log-likelihood based V-fold cross validation.

In at least some embodiments, all sentences of a document may be classified into a respective topic by using generative statistical modeling such as Latent Dirichlet allocation (LDA) to model each sentence as a mixture of latent topics. A topic is a probability distribution over all words belonging to a vocabulary. With Gibbs sampling performed in conjunction with and/or as part of the Latent Dirichlet allocation, the parameters of the LDA model can converge to a stationary posterior distribution over assignments of the topics in all sentences. With LDA, two matrices are formed which estimate (1) the number of times a topic is used within a document or text corpus and (2) the number of times a particular word is used in association with a respective topic. Correct weights for words being assigned to a particular topic are maximized for likelihood of assignment. For each word, a vector of probabilities is produced that explains, based on a respective likelihood of the word per topic, how likely it is that this word belongs to a respective topic. LDA may also incorporate a Dirichlet parameter for document to topic distribution and a second Dirichlet parameter for topic to word distribution. Using mathematics, the semantic classifier finds a conditional probability distribution of the topic assignment of a single word conditioned on the rest of the topic assignments. The two matrices are slowly changed to produce an answer set that maximizes the likelihood of the data. The matrices are changed on a word by word basis by changing the topic assignment of one word. It is assumed that the topic assignment of the given word is unknown but can be inferred due to knowledge of the topic assignment of all other words in the text corpus. A Dirichlet parameter controls if all the words have same probability in a topic or if a topic has an extreme bias towards some words. Another Dirichlet parameter controls similarly for distribution of topics in a text corpus/document.

In a first part of the sentence-topic classification, the frequency of each word belonging to every latent topic can be determined. This frequency is determined in some embodiments by using an algorithm for successively sampling conditional distributions of variables, whose distribution over states converges to the true distribution eventually. A Gibbs sampling is an example of such an algorithm and may converge to a stationary posterior distribution. Table 1 below illustrates an example of a topic word frequency matrix that is produced via the Gibbs sampling described above.

TABLE 1

|  | Word #1 | Word #2 | Word #3 | . . . | Word #N |
|---|---|---|---|---|---|
| Topic #1 | 6 | 4 | 7 | . . . | 3 |
| Topic #2 | 2 | 4 | 5 | . . . | 8 |
| Topic #3 | 4 | 8 | 3 | . . . | 3 |

Table 1 shows, in the top row, the words of a vocabulary for the text corpus. In other words, each unique word that is not an article or not a conjunction and is from the training text corpus may have its own cell within the top row of this topic word frequency matrix. In some instances, articles and conjunctions and other non-substantive words are removed from the training text data before performing the topic frequency analysis and frequency matrix creation. Table 1 shows the various possible topics in the left-most column. Along each of the other columns, a number is included which indicates that, amongst all sentences sampled, the particular word was matched as being associated with a particular topic. For example, throughout the sentences the word #1 was determined as being associated with Topic #1 in six different instances, with Topic #2 in two different instances, and with Topic #3 in four different instances.

In a second part of the sentence-topic classification, the frequency matrix, e.g., the Table 1 above, is converted to a corresponding probability distribution matrix using the following formula I:

$$\mathcal{P}_{ij} = \frac{f_{ij}}{\sum_{j=1}^{M} f_{ij}}$$

may be used where:
$\mathcal{P}_{ij}$ indicates the probability value of the i-th word belonging to the j-th latent topic;
$f_{ij}$ indicates the frequency of the i-th word belonging to the j-th latent topic; and
M indicates the number of the latent topics.

TABLE 2

|  | Word #1 | Word #2 | Word #3 | . . . | Word #N |
|---|---|---|---|---|---|
| Topic #1 | 0.5 | 0.25 | 0.47 | . . . | 0.21 |
| Topic #2 | 0.17 | 025 | 0.33 | . . . | 0.57 |
| Topic #3 | 0.33 | 0.5 | 0.2 | . . . | 0.21 |

From the information provided in the topic probability matrix, the semantic classifier 146 takes the latent topic with the highest probability value in the calculated probability distribution matrix as the topic to which that word belongs.

Thus, the Word #1 belongs to Topic #1, Word #2 belongs to Topic #3, Word #3 belongs to Topic #1, and Word #N belongs to Topic #2.

In a further stage, the information about individual words being associated with and/or belonging to a particular topic is used to determine the topic to which a sentence made up of multiple words belongs. The semantic classifier, for each sentence being analyzed, counts the number of words which belong to a particular topic. The results of this counting process may be indicated in a sentence topic frequency matrix as indicated in Table 3 below. The particular results build on the results from Table 2 but are based on assumption of two additional words (one belonging to Topic #1 and one belonging to Topic #3) being present in Sentence #1 that were not indicated above for Tables 1 and 2.

TABLE 3

|  | Topic #1 | Topic #2 | Topic #3 |
| --- | --- | --- | --- |
| Sentence #1 | 3 | 1 | 2 |

The sentence topic frequency matrix, e.g., the matrix shown in Table 3 above, may be converted to a corresponding probability distribution matrix using the following formula II:

$$\mathcal{L}_i = \frac{f_i}{\sum_{i=1}^{M} f_i}$$

may be used where:
$\mathcal{L}_i$ indicates the probability value of the sentence belonging to the i-th latent topic;
$f_i$ indicates the number of the words which belong to the i-th topic in the sentence; and
M indicates the number of the latent topics (in the above example is equal to 3).

TABLE 4

|  | Topic #1 | Topic #2 | Topic #3 |
| --- | --- | --- | --- |
| Sentence #1 | 0.5 | 0.17 | 0.33 |

From the information provided in this probability distribution matrix of Table 4, the semantic classifier 146 takes the latent topic with the highest probability value as the topic to which the sentence belongs. Thus, the Sentence #1 is deemed as belonging to the Topic #1 because 0.5>0.17 and 0.5>0.33.

In some embodiments, the semantic classifier 146 may repeat the process described above (associated with Tables 1 to 4) and using those formulas for additional semantic categories or sub-topics within a particular topic. Each topic may be determined as having two or more sub-topics that are deemed as distinct semantic categories.

As indicated in the concreteness analysis and conversion pipeline 140 shown in FIG. 1B, the output of the semantic classifier 146 is a semantic category 148 (such as a topic, a sub-topic, and/or a semantic category) for the first submitted sentence 144. For the example with the Tables 1 to 4 above and the Sentence #1 (corresponding to the first submitted sentence 144), the semantic category may be Topic #1 that is submitted to the Concreteness-level Classification Tree 150 as input to same. FIG. 1B shows that the first submitted sentence 144 is also submitted to the Concreteness-level Classification Tree 150 as another input to same.

Using these two inputs of the semantic category and the inputted sentence, the Concreteness-level Classification Tree 150 determines a concreteness level of the inputted sentence (e.g., of the first submitted sentence 144). The concreteness-level classification tree 150 may be part of the concreteness analysis and conversion recommendation program 916. The concreteness-level classification tree 150 may be pre-generated based on analysis of prior text electronic documents and/or may be generated based on analysis of multiple sentences of the current text corpus such as the first text corpus 142 whose sentence (the first submitted sentence 144) is being analyzed. The generation of and use of a concreteness-level classification tree is shown in FIGS. 2A-5 and is described in the present disclosure in the corresponding description of these drawings.

The concreteness-level classification tree 150 is built on principles of continuous dichotomy by analyzing sentences for their fit to two different levels of concreteness. The concreteness-level classification tree 150 may include a respective individual concreteness level classification tree for each semantic category, and, therefore, the semantic category 148 is needed as input to the concreteness-level classification tree 150. With that input of the semantic category 148, the concreteness-level classification tree 150 may select the appropriate individual tree through which the sentence being evaluated (e.g., the first submitted sentence 144) is passed. The concreteness-level classification tree 150 (or its individual tree) may contain multiple nodes each constituting a separate concreteness level. For building the tree, such nodes may be generated via continuous dichotomy of concreteness evaluation until all samples have merged into a respective leaf node of the tree. Then the sentence to be evaluated is passed through an existing tree until the sentence matches with the samples of one of the leaf nodes.

After the concreteness-level classification tree 150 is built/trained, a new sentence to be evaluated may be passed through concreteness-level classification tree 150 until the concreteness level of the sentence is determined. In response to the new sentence and its semantic category being input into the concreteness-level classification tree 150, the concreteness-level classification tree 150 produces as output a concreteness level 152 of the inputted sentence (e.g., the first submitted sentence 144). For an existing classification tree, tree structure such as tree nodes, connecting edges between nodes, the related concreteness level-word probability matrix, and trained LDA model of each node (if any) will be used for inferring/evaluating the concreteness level of a new sentence from a semantic category. No individual prior sentence sample needs a discrete comparison to the new sentence during the concreteness level inference.

This concreteness level 152 is input into a comparator 154 to compare against a target concreteness level for the sentence. The comparator 154 in the pipeline 140 compares the concreteness level 152 to the target concreteness level 156. The target concreteness level 156 may be determined via the concreteness analysis and conversion recommendation program 916 based on user input and/or output of the concreteness-level classification tree 150. The target concreteness level 156 in at least some embodiments is a scalar number such as 1, 2, 3, 4, 5, etc. Determining the target concreteness level 156 is described above in the discussion regarding step 106 of the process 100. In at least some embodiments, the target concreteness level 156 is determined based on a majority concreteness level of other sentences within the same semantic category 148. The comparator 154 has substantial overlap in its performance as the steps 108 and 110 in the process 100 described above. Thus, above features or aspects related to steps 108 and 110 may also apply to the comparator 154 of the pipeline 140.

The pipeline 140 shows that if the comparator 154 determines that the concreteness level 152 is already the same as the target concreteness level 156, then the pipeline 140 may return to a checker 164 which checks if the first text corpus 142 has any more sentences to be analyzed and, therefore, retrieved. The earlier portions of the pipeline 140 may be repeated for any more sentences of the first text corpus 142 that need to be analyzed. The checker 164 may also direct the pipeline 140 to end if all sentences of the text corpus have been analyzed with respect to concreteness.

The pipeline 140 also shows that if the comparator 154 determines that the concreteness level 152 is different from the target concreteness level 156, then the pipeline 140 proceeds to the Concreteness-level Conversion Generator 158. The Concreteness-level Conversion Generator 158 receives as input the sentence currently being analyzed (e.g., the first submitted sentence 144) and the target concreteness level 156. The Concreteness-level Conversion Generator 158 is in at least some embodiments part of the concreteness analysis and conversion recommendation program 916. The concreteness-level conversion generator 158 may produce a sentence change proposal which preserves the general meaning of the inputted sentence but includes either an increased or decreased level of detail in the sentence. This concreteness-level conversion generator may be a machine learning model which is trained to receive a sentence and a target concreteness level as inputs and in response produce a modified sentence with the target concreteness level as an output. Examples and details of the training of the concreteness-level conversion generator are shown in FIGS. 6A to 8B of the drawings and the corresponding description of these drawings in the present disclosure.

In one example, if the inputted sentence is "Log into the system with your account." with a current concreteness level of 1 and the target concreteness level is 2, the Concreteness-level Conversion Generator 158 may produce as output a sentence change proposal as "Log into the system by entering your username and password in the login window." as a proposed new sentence that includes a sentence change proposal. The proposed new sentence 160 is presented to the user for approval and, if approved, added to the revised text corpus 162 in place of the first submitted sentence 144. In some embodiments, the portions of the sentence change proposal that are new may be presented in a first manner that is different from a manner with which original portions of the sentence are presented. Such differing presentations may be visual differences such as different fonts or font characteristics or audible differences such as a different voice speaking the new and original sentence portions, respectively.

The Concreteness-level Conversion Generator 158 has substantial overlap in its performance as the step 112 in the process 100 described above. Thus, above features or aspects related to step 112 may also apply to the Concreteness-level Conversion Generator 158 of the pipeline 140.

The revised text corpus 162 that includes the new sentence 160 may be presented for the user, e.g., in a visual, audible, and/or tactile manner. Step 114 of the process 100 relates to the revised text corpus 162 of the pipeline 140 so that features and aspects described above for step 114 also apply for the revised text corpus 162 of pipeline 140.

The pipeline 140 may also incorporate user approval aspects such as those described above for steps 116 and 118 of the process 100.

The pipeline 140 may then return to a checker 164 which is equivalent to the step 120 of the process 100. The checker 164 checks if the first text corpus 142 has any more sentences to be analyzed and, therefore, retrieved. The earlier portions of the pipeline 140 may be repeated for any more sentences of the first text corpus 142 that need to be analyzed. The checker 164 may also direct the pipeline 140 to end if all sentences of the text corpus have been analyzed with respect to concreteness. The checker 164 may be a module of the concreteness analysis and conversion recommendation program 916. The checker 164 may check whether the most-recently checked sentence was a last sentence of the text corpus, e.g., of the first text corpus 142, and determine that no more sentence needs to be checked if that determination is affirmative. The checker 142 may then send the pipeline 140 to the end stage.

FIGS. 2A, 2B, 3, and 4 illustrate aspects of generation of and/or training of a concreteness-level classification tree such as the Concreteness-level Classification Tree 150 shown in the pipeline 140 of FIG. 1B. FIG. 5 illustrates aspects of using a concreteness-level classification tree that was generated via the FIGS. 2A, 2B, 3, and 4 steps and features for concreteness classification of a new sentence.

Figure 3:
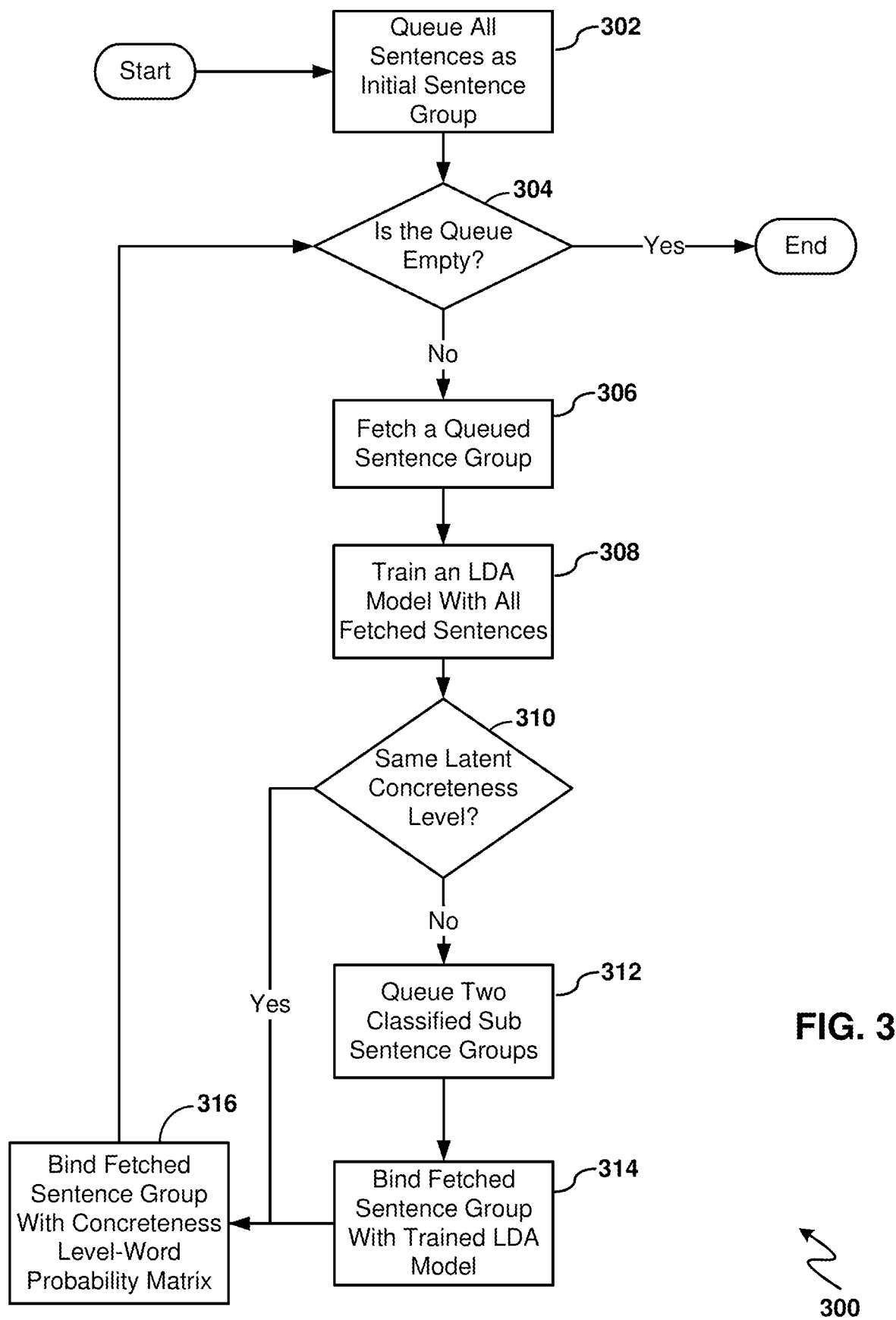
FIG. 3 is an operational flowchart illustrating a process for building a classification tree according to at least one embodiment.

FIG. 2A illustrates aspects of a concreteness-level classification tree according to at least one embodiment and used in the automated concreteness conversion process and pipeline shown in FIGS. 1A and 1B, respectively. FIG. 2A shows a word probability matrix tree 200 of a second concreteness-level classification tree. The second concreteness-level classification tree functionally is constructed by and operates under the same principles and techniques used for the Concreteness-level Classification Tree 150 shown in FIG. 1B. The second concreteness-level classification tree 200 is labeled as a second one, however, for clerical distinction purposes. FIG. 2B illustrates sentence dot tree 260 of the second concreteness-level classification tree. The word probability matrix tree 200 of FIG. 2A and the sentence dot tree 260 of FIG. 2B are different aspects of showing the same tree. FIG. 3 is an operational flowchart illustrating a classification tree building process 300 for building a classification tree according to at least one embodiment. The elements and significance of the word probability matrix tree 200 of FIG. 2A and the sentence dot tree 260 of FIG. 2B will be described below along with the description of the steps of the classification tree building process 300.

In step 302 of the classification tree building process 300 shown in FIG. 3, all sentences are queued as an initial group. The reference to "all sentences" refers to a group of sentences that are present together such as in a document and/or a text corpus. These sentences may all be from the same topic, the same sub-topic, and/or the same semantic category. Thus, the concreteness analysis and conversion recommendation program 916 may receive information from a semantic classifier 146 in order to perform step 302. Sentences may be saved in a computer memory of the concreteness analysis and conversion recommendation program 916 according to topic, sub-topic, and/or semantic category. The concreteness analysis and conversion recommendation program 916 may electronically retrieve sentences from an electronic document that is stored on a computer and which may currently be viewed on a computer display screen via document editing software. The queue may represent temporary data storage or cache that is part of or accessible to the concreteness analysis and conversion recommendation program 916.

In step 304 of the classification tree building process 300 shown in FIG. 3, a determination is made whether the queue is empty. The queue refers to the queue involved in step 302. If the determination of step 304 is affirmative and the queue is empty, then the classification tree building process 300 proceeds to end. The generated classification tree may then be used to provide concreteness level classifications for new sentences. If the determination of step 304 is negative and the queue is not empty, then the classification tree building process 300 proceeds to step 306. In the first iteration through the classification tree building process 300, those sentences queued from step 302 will necessarily be in the queue so that step 304 would be negative (because the queue is not empty at that point). For subsequent iterations through the classification tree building process 300, the determination of step 304 may be affirmative or negative because there may be additional sentences to examine or no more sentences to examine.

In step 306 of the classification tree building process 300 shown in FIG. 3, a queued sentence group is fetched. This fetching may refer to pulling text data from the queue and bringing the pulled sentences to another memory location and/or for disbursement in software code which will disburse the text data of these sentences for analysis. The sentences that are fetched have not yet had a concreteness level-word probability matrix created for them yet. In an initial pass through the classification tree building process 300, the concreteness analysis and conversion recommendation program 916 takes the entire initialized group from step 302 as the queued group. In subsequent passes through the same iteration of the classification tree building process 300, step 312 may queue sentence sub-groups separately back into the queue. Those sub-groups may be analyzed separately and/or discretely in steps 306, 308, and 310, etc. for the subsequent passes through the process 300 in the same iteration.

In step 308 of the classification tree building process 300 shown in FIG. 3, an LDA model is trained with all fetched sentences of the fetched group. The fetched group refers to the sentence group that was fetched in step 306. Use of an LDA model was described above with respect to the semantic classifier 146. Instead of finding connection of words to a topic, however, the LDA performed for step 308 will find a connection of words to one of two concreteness levels—namely to either a first concreteness level or to a second concreteness level (which has more concreteness, i.e. details and information, than the first concreteness level has). Similar to Table 1 above, Table 5 below takes words of the fetched group and finds a number of instances with which each word would be matched with the Concreteness Level #1 and with the Concreteness Level #2.

TABLE 5

|  | Word #1 | Word #2 | ... | Word #N |
|---|---|---|---|---|
| Concreteness Level #1 | 8 | 3 | ... | 5 |
| Concreteness Level #2 | 7 | 6 | ... | 12 |

Using the formula I indicated above, the concreteness level-word frequency matrix may be converted into a concreteness level-word probability matrix as, for example, indicated in Table 6 below (which is comparative to Table 2 above for the semantic categorization). The root node concreteness level-word probability matrix 202 shown in FIG. 2A is an example of the output of that conversion on different one or more sentences and corresponds to Table 6 below.

TABLE 6

|  | Word #1 | Word #2 | ... | Word #N |
|---|---|---|---|---|
| Concreteness Level #1 | 0.53 | 0.33 | ... | 0.29 |
| Concreteness Level #2 | 0.47 | 0.67 | ... | 0.71 |

Then a concreteness level for a particular sentence is determined by the program 916 counting the number of concreteness levels to which a particular word of a sentence belongs. Table 7 below illustrates an example of a new sentence GG being analyzed via this count to form a sentence-concreteness level matrix. This matrix of Table 7 corresponds to the sentence-topic matrix of Table 3, but with needing just two columns because, according to the principles of continuous dichotomy, two concreteness levels alone are examined per iteration.

TABLE 7

|  | Concreteness Level #1 | Concreteness Level #2 |
|---|---|---|
| Sentence #1 | 12 | 2 |

The sentence-concreteness level matrix may be converted to a concreteness level probability distribution matrix using the formula II provided above. An exemplary result is shown below in Table 8 which corresponds to Table 4 above.

TABLE 8

|  | Concreteness Level #1 | Concreteness Level #2 |
|---|---|---|
| Sentence #1 | 0.86 | 0.14 |

The program 916 takes the concreteness level with the highest probability value as the inferred concreteness level of a particular sentence. Iteratively repeating this concreteness level determination for each sentence of the group of sentences may then allow the concreteness levels of the various sentences in the group to be compared to each other.

In step 310 of the classification tree building process 300 shown in FIG. 3, a determination is made whether the sentences in the current group have the same latent concreteness level. The current group refers to the group of sentences for which the LDA model was trained in step 308. If the determination of step 310 is affirmative and the sentences have the same latent concreteness level, then the classification tree building process 300 proceeds to step 316 and skips steps 312 and 314. If the determination of step 310 is negative and the sentences of the examined group have at least one different concreteness level, then the classification tree building process 300 proceeds to step 312. This determination may be performed via a comparator of the program 916 which compares scalar numbers. The concreteness levels may be indicated by a respective scalar number assigned to a particular sentence. If for a particular semantic category, all sentences share the same concreteness level then the classification tree produced for this semantic category has just a single node which itself constitutes a root node and a leaf node. For the classification tree 200 shown in FIG. 2A, in the first iteration through the classification tree building process 300 the sentences will be split into two sub-groups (one each for the two concreteness levels) instead of all being in a single concreteness level. In FIG. 2A, the root node concreteness level-word probability matrix 202 will link to two concreteness level-word probability matrices that are bound with the two sub-groups respectively in the first level below the root node concreteness level-word probability matrix 202.

In step 312 of the classification tree building process 300 shown in FIG. 3, two classified sub sentence groups are queued. This step 312 is performed after a determination in step 310 that not all of the sentences in the currently examined group have the same concreteness level. The sub sentence groups refer to the two groups of sentences in step 310 that had differing concreteness levels. Those sentences from the first concreteness level may be classified as a first sub sentence group. Those sentences from the second concreteness level may be classified as a second sub sentence group. The two sub sentence groups may be queued in turn in step 312, meaning that the groups are placed into the queue as two separate groups which will subsequently be fetched as separate groups. This queue is the same queue that was filled in step 302. By being placed in the queue, these sub-groups will be analyzed in subsequent loops through the classification tree building process 300 but on a sub-group by sub-group basis.

In step 314 of the classification tree building process 300 shown in FIG. 3, a fetched sentence group is bound with an LDA model that was trained in step 308. For a fetched sentence group, an LDA model trained at step 308 needs to be kept/saved and bound with, e.g., assigned to, this sentence group. This particular trained LDA model will be used for the inference of a new sentence. The word "bound" may indicate "mapping a trained LDA model to the corresponding fetched sentence group" so that this LDA model may be accessed when the fetched sentence group is referenced.

In step 316 of the classification tree building process 300 shown in FIG. 3, a fetched sentence group is bound with a concreteness level-word probability matrix that is related to an LDA model trained in step 308. This step 316 maps the fetched sentence group to a corresponding concreteness level-word probability matrix. A trained LDA model for this sentence group includes a related concreteness level-word probability matrix (that includes two but not more latent concreteness levels). This related concreteness level-word probability matrix needs to be mapped/bound/assigned to the fetched sentence group, because this matrix will be used as a tree node.

After step 316, the classification tree building process 300 returns to step 304 for a check of whether the queue is empty. If the queue is not empty, the classification tree building process 300 may repeat steps 306, 308, 310, and 316 and potentially steps 312 and 314 with respect to the other sentences in the queue.

Using the example tree shown in FIG. 2A, in a second time through the loop the first sub-group is determined as having all portions belong to the same concreteness level. Thus, a concreteness level-word probability matrix that is bound with the first sub-group is classified as a first leaf node 204 of the tree 200. In a third time through the loop in this iteration of the tree building process 300, the second sub-group is determined as having one or more sentences in a new first concreteness level and one or more sentences in a new second concreteness level. Thus, the sentences of the second sub-group are split into two new sub-groups which are placed in turn back into the queue. The concreteness level-word probability matrix that is bound with the second sub-group at node 206 will link to two concreteness level-word probability matrices that are bound with those two new sub-groups respectively in the level below the node 206 (which level is the second level below the root node concreteness level-word probability matrix 202). In a fourth time through this iteration of the tree building process 300, the first new sub-group is determined as all having the same concreteness level. Thus, a concreteness level-word probability matrix that is bound with this first new sub-group is classified as another leaf node, in this instance a second leaf node 208*a*. In a fifth time through this iteration of the tree building process 300, the second new sub-group is determined as all having the same concreteness level. Thus, a concreteness level-word probability matrix that is bound with this second new sub-group is classified as another leaf node, in this instance a third leaf node 208*b*. Thus, the example classification tree 200 shown in FIG. 2A has three total leaf nodes (first, second, and third 204, 208*a*, 208*b*) which represent different concreteness levels which sentences from this semantic category may have. For simplicity, the first leaf node 204 may be deemed as having a Concreteness level #1, the second leaf node 208*a* may be deemed as having a Concreteness level #2, and the third leaf node may be deemed as having a Concreteness level #3.

The continuous dichotomy of iteratively splitting the sentences into two groups until all sentences within a group are deemed as being within the same concreteness level continues until the queue is empty and there are no more sentences for this semantic category that are left to analyze. This process may be repeated to create a separate classification tree for each topic, sub-topic, and/or semantic category indicated by the semantic classifier. All of the concreteness level-word probability matrices form a classification tree based on the mappings between each sentence group in the sentence dot tree and a related concreteness level-word probability matrix.

FIG. 2B illustrates sentence dot tree 260 of the second concreteness-level classification tree. The concreteness level-word probability matrix tree 200 of FIG. 2A and the sentence dot tree 260 of FIG. 2B are different aspects of showing the same tree. The sentence dot tree 260 shows a root sentence node 262 in which all of the sentences from the semantic category are present, with each dot within the root sentence node 262 representing a different sentence. Thus, the ten dots in root sentence node 262 represent ten respective sentences in this particular semantic category. The root sentence node 262 corresponds to the root node concreteness level-word probability matrix 202 regarding the particular group of sentences that are relevant to information there.

After performing the concreteness level classification for a sentence group, the sentences of the root sentence node 262 are split into a first leaf sentence node 264 and a second level sentence node 266. FIG. 2B shows that of the original ten sentences of the root sentence node 262, five of those were split to belong in the first leaf sentence node 264 and the other five sentences were split to belong in the second level sentence node 266. The first leaf sentence node 264 corresponds to the first leaf node 204 regarding the particular group of sentences that are relevant to information there. The second level sentence node 266 corresponds to the node 206 regarding the particular group of sentences that are relevant to information there.

After performing the concreteness level classification for the sentence sub-group represented by second level sentence node 266, the sentences of this second level sentence node 266 are split into a second leaf sentence node 268a and a third leaf sentence node 268b. FIG. 2B shows that of the five sentences of the second level sentence node 266, four of those were split to belong in the second leaf sentence node 268a and the other sentence was split from the group to belong by itself in the third leaf sentence node 268b. The second leaf sentence node 268a corresponds to the second leaf node 208a regarding the particular group of sentences that are relevant to information there. The third leaf sentence node 268b corresponds to the node 208b regarding the particular group of sentences that are relevant to information there. For the nodes that are leaf nodes, it is not clear during the classification tree building process 300 that these nodes will be leaf nodes until another loop through the classification tree building process 300 is done and a determination is achieved that all sentences within that node group have the same concreteness classification level.

Figure 4:
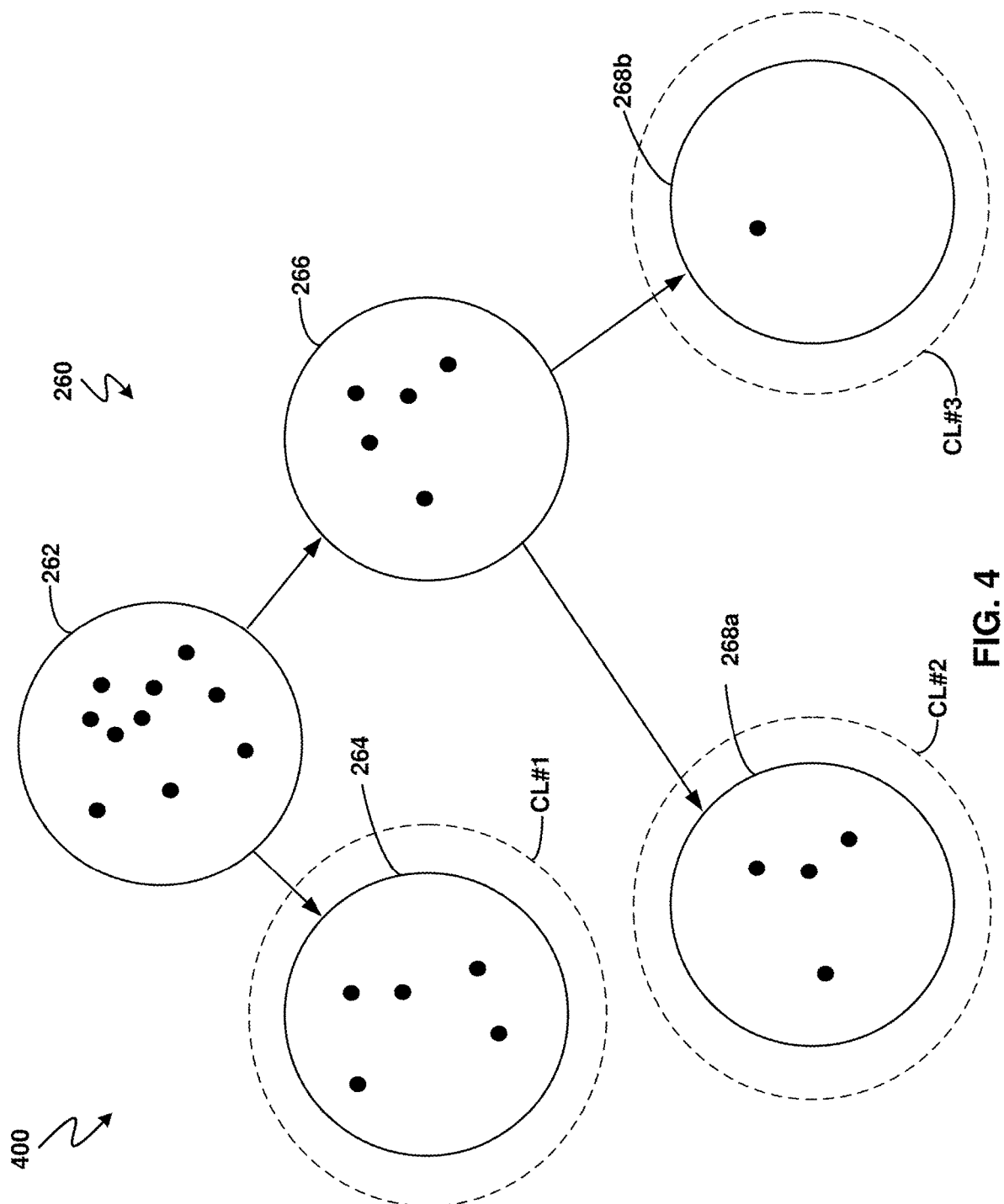
FIG. 4 illustrates a leaf node highlight view according to at least one embodiment of the sentence node tree of FIG. 2B.
Figure 5:
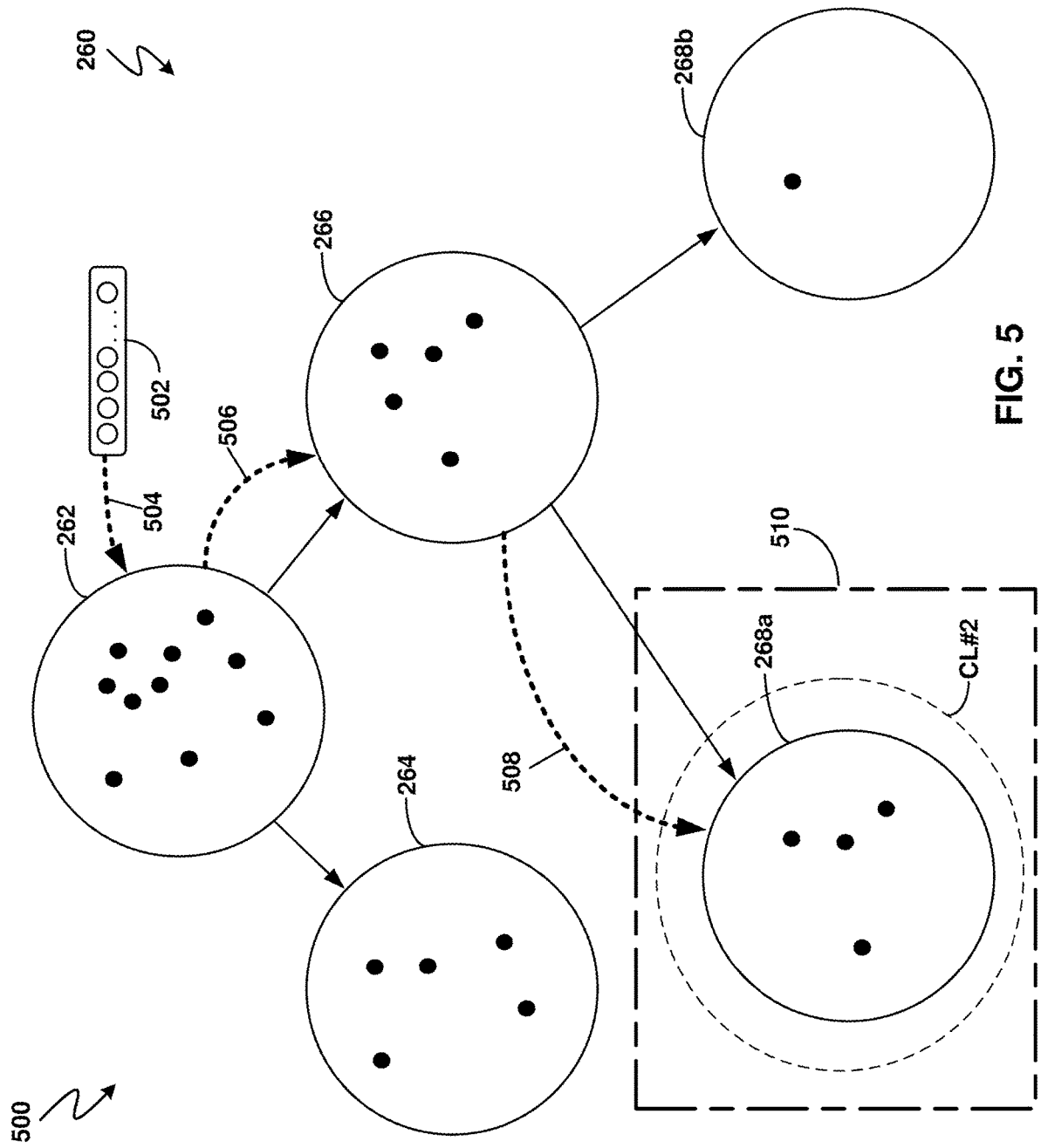
FIG. 5 illustrates aspects according to at least one embodiment of using the classification tree shown in FIG. 2A to classify concreteness level of a sentence.

FIG. 4 illustrates a leaf node highlight view 400 which shows the sentence node tree 260 from FIG. 2B but with the leaf nodes highlighted with dotted circles. The first leaf sentence node 264 is highlighted with a first dotted circle CL #1 to indicate representation of a first concreteness level within the tree and within the semantic category. The second leaf sentence node 268a is highlighted with a second dotted circle CL #2 to indicate representation of a second concreteness level within the tree and within the semantic category. The third leaf sentence node 268b is highlighted with a third dotted circle CL #3 to indicate representation of a third concreteness level within the tree and within the semantic category.

The number of leaf nodes in a classification tree indicates the total number of the concreteness levels for a given semantic category. For the generation of the classification tree, the program 916 assigns each sentence group of a leaf node in a sentence dot tree with a concreteness-level index according to the depth-first traversal order. The concreteness-level index refers to the concreteness level 1, 2, or 3, respectively, as indicated with the first, second, and third dotted circles CL #1, CL #2, and CL #3, respectively. The program 916 maps a particular group of sentences for a particular concreteness to the latent concreteness level to which the particular concreteness belongs in the concreteness level-word probability matrix that is bound to the parent node of the particular sentence group. Sentences in divided groups form a training data set for our concreteness-level conversion generator.

FIG. 5 illustrates a sentence concreteness level inference pass through view 500 according to at least one embodiment which illustrates an example of using the concreteness level classification tree shown in FIGS. 2A, 2B, and 4 to perform concreteness level classification of a new sentence. The Concreteness-level Classification Tree 150 that was depicted in the pipeline 140 of FIG. 1B may be used in a similar manner in order to classify concreteness level of a new sentence. In the pipeline 140 of FIG. 1B, a semantic category 148 and a first inputted sentence are received by and used by the Concreteness-level Classification Tree 150 to determine a concreteness level for this sentence. The concreteness level of a new sentence can be inferred by the program 916 passing the new sentence through the respective concreteness-level classification tree that corresponds to a semantic category for that new sentence.

In a first part of the pass-through, a candidate sentence 502 is considered as belonging to the sentence group at the root node of the classification tree, e.g., to the root nodes 202, 262 of the classification trees 200, 260, respectively. The first dotted arrow 504 in pass through view 500 indicates that the candidate sentence 502 is considered as belonging to the sentence group at the root sentence node 262. The classification tree uses the previously trained LDA model that is related to the root node concreteness level-word probability matrix 202 to infer the new sentence. In the present example, the candidate sentence 502 is inferred by that LDA model to determine that the candidate sentence 502 belongs to the second level sentence node 266 instead of to the first leaf sentence node 264. Thus, the next step in the pass-through is for the program 916 to pass the candidate sentence to the previously trained LDA model that is related to the second level sentence node 266 to infer the candidate sentence 502. The second dotted arrow 506 in pass through view 500 indicates that the candidate sentence is determined as belonging to the sentence group at the second level sentence node 266. In the present example, the candidate sentence 502 is inferred by that LDA model as belonging to the second leaf sentence node 268a instead of the third leaf sentence node 268b. Based on that determination, a third dotted arrow 508 indicates that the candidate sentence 502 is determined as belonging to the sentence group of the second leaf sentence node 268a. Because the program 916 recognizes that the second leaf sentence node 268a is the last node on this branch, the inference can be stopped and the candidate sentence 502 is marked as having the concreteness level of the second leaf sentence node 268a which according to FIG. 4 was concreteness level #2. The inference result is indicated in the pass-through view 500 with the inference result box 510. Thus, the concreteness-level classification tree can output the concreteness level associated with this sentence and forward the concreteness level forward to the comparator for determining if a sentence change proposal should be generated.

Figure 6A:
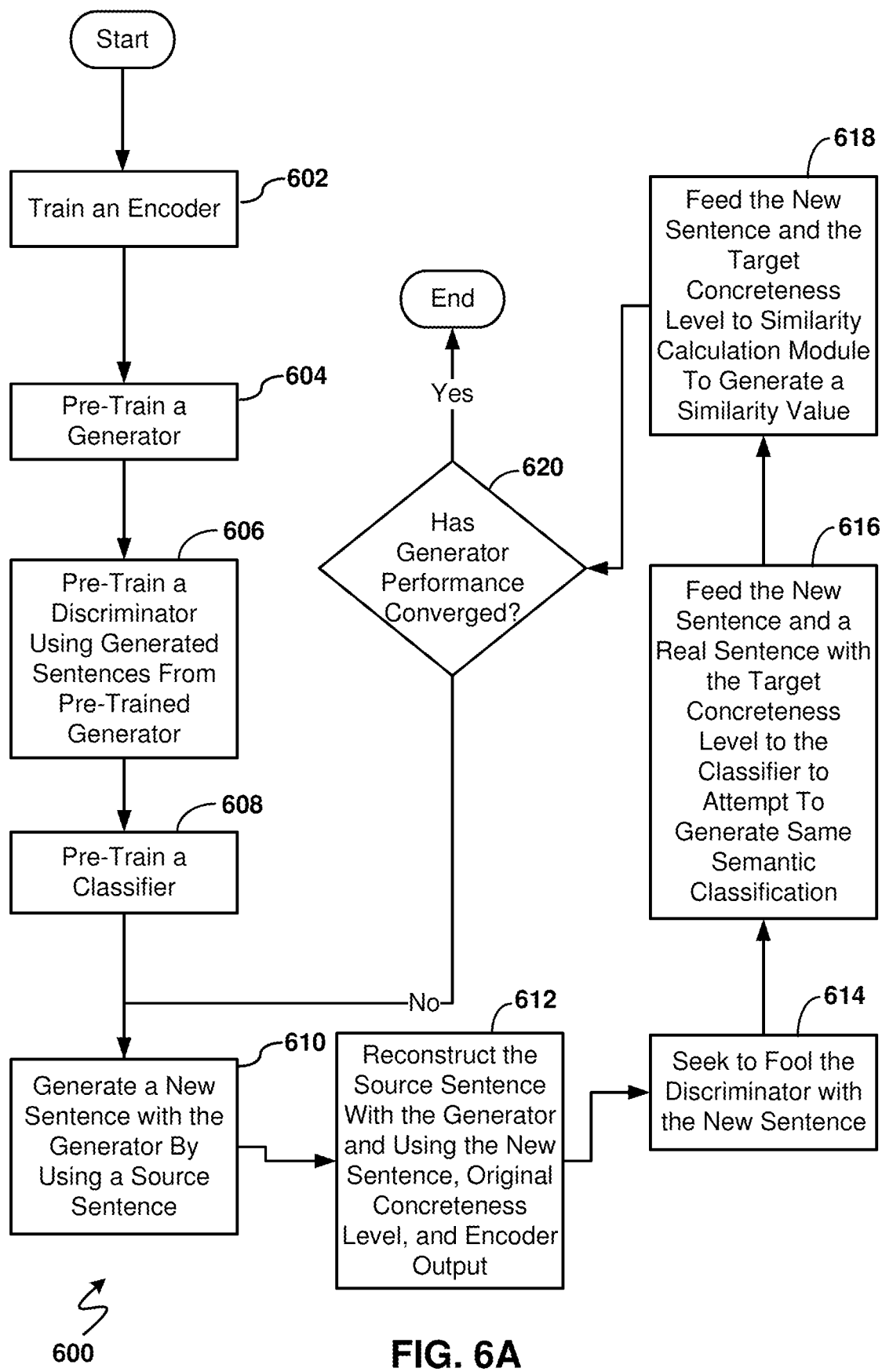
FIG. 6A is an operational flowchart illustrating a process for building a concreteness conversion generator according to at least one embodiment that may be used in the automated concreteness conversion process and pipeline shown in FIGS. 1A and 1B.
Figure 6B:
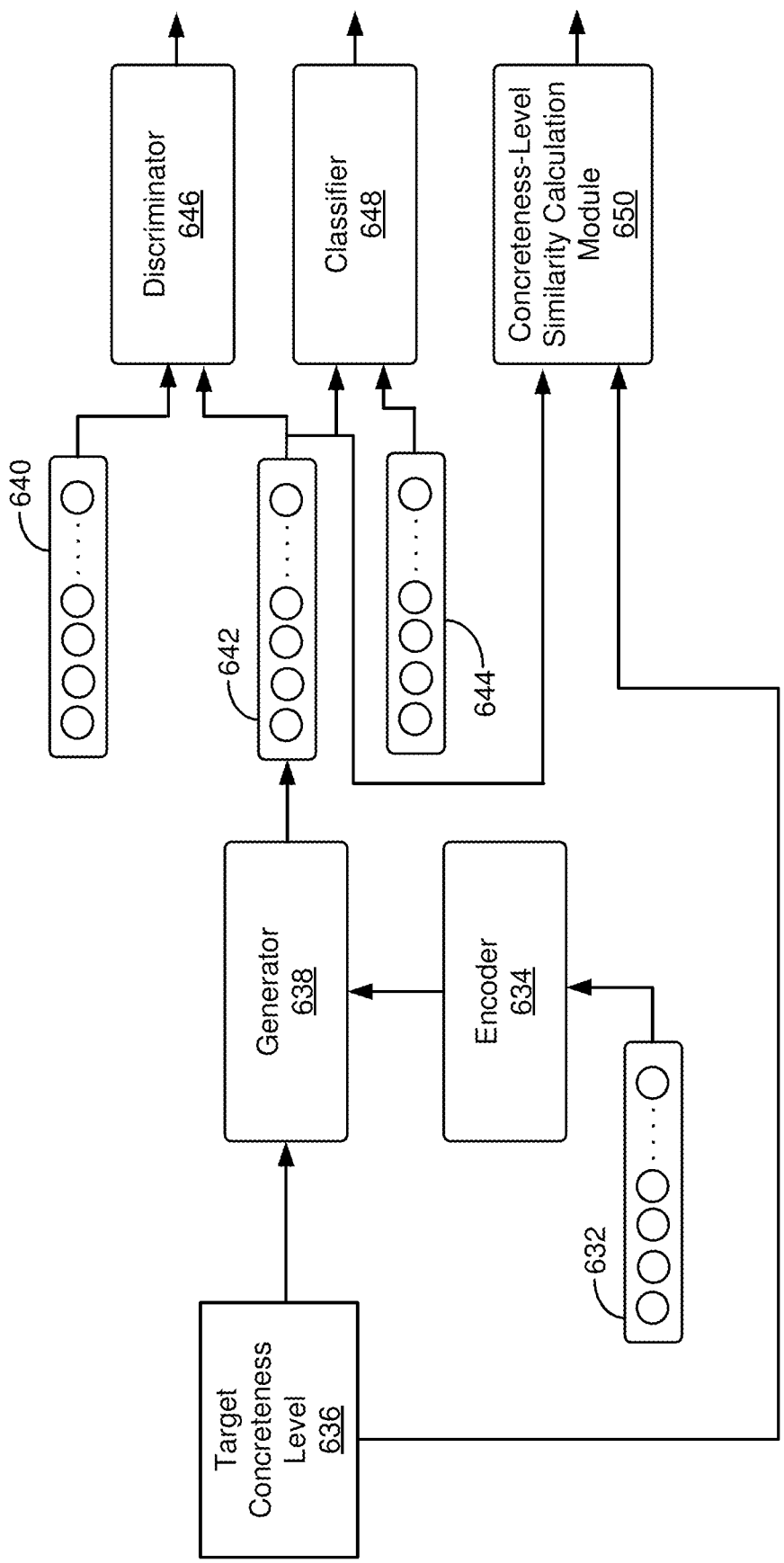
FIG. 6B illustrates a pipeline according to at least one embodiment for building a concreteness conversion generator and that corresponds to the process shown in FIG. 6A.

FIG. 6A is an operational flowchart illustrating a concreteness conversion generator building process 600 for building a concreteness conversion generator according to at least one embodiment that may be used in the automated concreteness conversion process 100 shown in FIGS. 1A and 1n the pipeline 140 shown in FIG. 1B. FIG. 6B illustrates a conversion generator building pipeline 630 for the process for building the concreteness conversion generator that corresponds to the process 600 shown in FIG. 6A. The concreteness conversion generator is a machine learning model that in one embodiment is a text generative adversarial network that is configured to generate a new sentence with a same general meaning as an original sentence but with increased or decreased concreteness, e.g., detail, for the sentence according to a desired or target concreteness level.

Figure 6C:
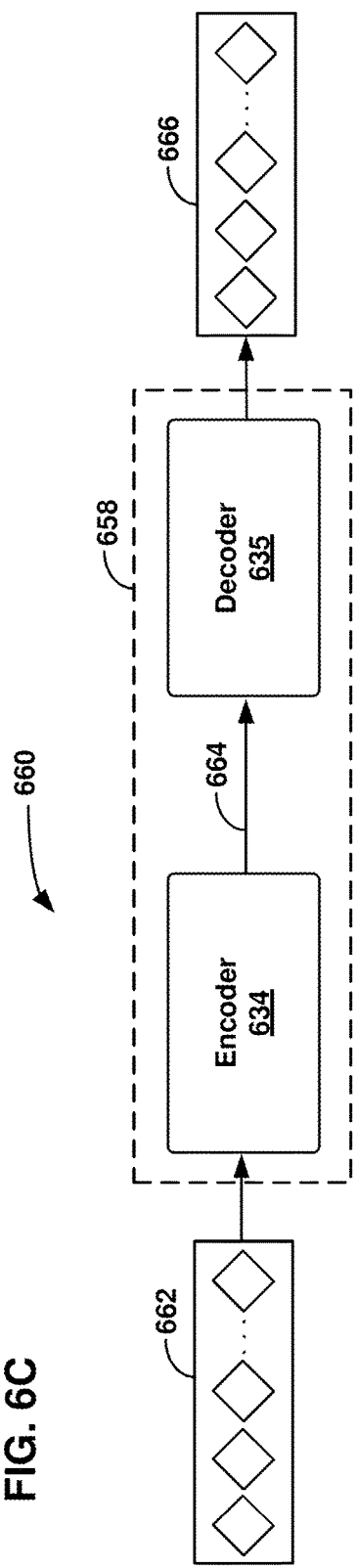
FIG. 6C illustrates a pipeline for training an encoder according to at least one embodiment to be used as part of the concreteness conversion generator that is implemented in the automated concreteness conversion process and pipeline shown in FIGS. 1A and 1B.

In step 602 of the concreteness conversion generator building process 600 shown in FIG. 6A, an encoder is trained. An encoder is replicated the encoder to obtain a decoder. The encoder and decoder are then combined with each other to compose a sequence transformation model. FIG. 6C shows aspects of training the encoder for subsequent usage in the concreteness conversion generator building process 600. FIG. 6C shows that the encoder 634 and the decoder 635 together form a sequence transformation deep learning model 658. The sequence transformation deep learning model 658 may be trained via auto-regressive language modeling. e.g., left-to-right prediction. An encoder-decoder architecture, e.g., an autoencoder, in at least some embodiments is an example of the deep learning model 658. A training text corpus may be broken down into numerous sentences such as an input sentence 662 which is input into the encoder 634. Thus, auto-regressive language modeling is performed in this pre-training. The last hidden state of the encoder 634 is transmitted in an encoder transmission 664 to the decoder 635 as input to the decoder 635. The training of the deep learning model 658 may include cross entropy loss and backpropagation to update and refine the parameters of the encoder 634 and the decoder 635. The decoder 635 produces as its output and as output of the deep learning model 658 a predicted sentence 666 which seeks to predict the entire sentence of the input sentence 662. This predicted sentence 666 is used for the cross entropy loss and backpropagation. Backpropagation is an algorithm for training neural networks and may be used to help fit a neural network. Backpropagation may compute the gradient of the loss function with respect to the weights of the network and may be used to help train multilayer networks including by updating weights to minimize loss. The gradient of the loss function may be determined with respect to each weight by the chain rule. The gradient may be computed one layer at a time—iterating backward from the last layer to avoid redundant calculations of intermediate terms in the chain rule. Cross-entropy may be used as a loss function when optimizing neural networks that are performing classification. The decoder 635 helps train the encoder 634 for later use for training the concreteness conversion generator. The decoder 635 is not needed for later usage after the encoder 634 is pre-trained.

In step 604 of the concreteness conversion generator building process 600 shown in FIG. 6A, a generator is pre-trained. In at least some embodiments, the generator is pre-trained using MLE (Maximum Likelihood Estimation) based on some or all sentences from a training data set. Cross entropy loss and backpropagation may be implemented to update parameters of the generator. During the pre-training, the generator does not take in a last hidden state from the encoder 634. During the pre-training, an initial hidden state of the generator is initialized to zero values ("0").

Figure 7A:
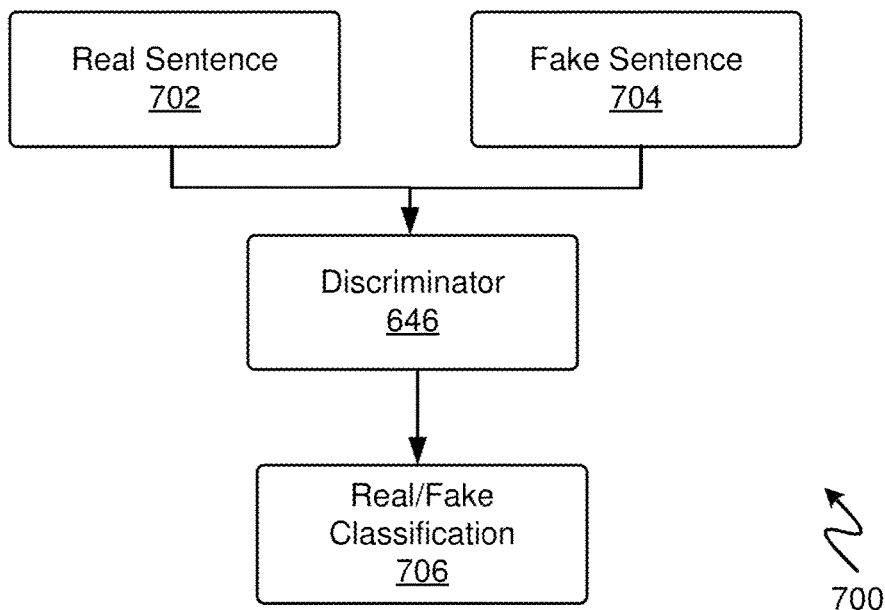
FIG. 7A illustrates a pipeline for training a discriminator according to at least one embodiment that may subsequently be used in the process for training a concreteness conversion generator shown in FIG. 6A and in the pipeline shown in FIG. 6B.

In step 606 of the concreteness conversion generator building process 600 shown in FIG. 6A, a discriminator is pre-trained using generated sentences from the pre-trained generator. The pre-trained generator refers to the generator that was pre-trained in step 604. This pre-training may occur via minimizing a cross entropy based on randomly selected real sentences from the training data set and the generated sentences from the pre-trained generator. Backpropagation may be performed to update parameters of the discriminator. FIG. 7A illustrates a discriminator training pipeline 700 that illustrates aspects of step 606. One or more real sentences 702 and one or more fake sentences 704 are, in turn, input into the discriminator 646 which itself is a classifier. In response to the inputting, the discriminator produces as output a classification 706 as to whether the particular input sentence is a real sentence or is a fake sentence. The backpropagation may be performed on that classification 706. In at least some embodiments, the discriminator 646 uses a convolutional neural network ("CNN") with a highway structure to distinguish between real sentences 702 and fake sentences 704.

In step 608 of the concreteness conversion generator building process 600 shown in FIG. 6A, a classifier is pre-trained. The classifier is subsequently used in the adversarial training of the generator, but is pre-trained separately from the discriminator, from the generator, and from the encoder. In at least one embodiment, the training of the classifier may occur via (1) randomly selecting two sentences from the pre-built training data set as two inputs, (2) dynamically setting the training label, and (3) using cross entropy loss and backpropagation to update parameters of the classifier. For the second step, the training label may be set as "1" to indicate semantic similarity of the two input sentences with respect to each other if the two input sentences belong to the same semantic category or are the same sentence. The training label may alternatively be set as 0 to indicate semantic dissimilarity of the two input sentences with respect to each other if the two input sentences do not belong to the same semantic category.

Figure 7B:
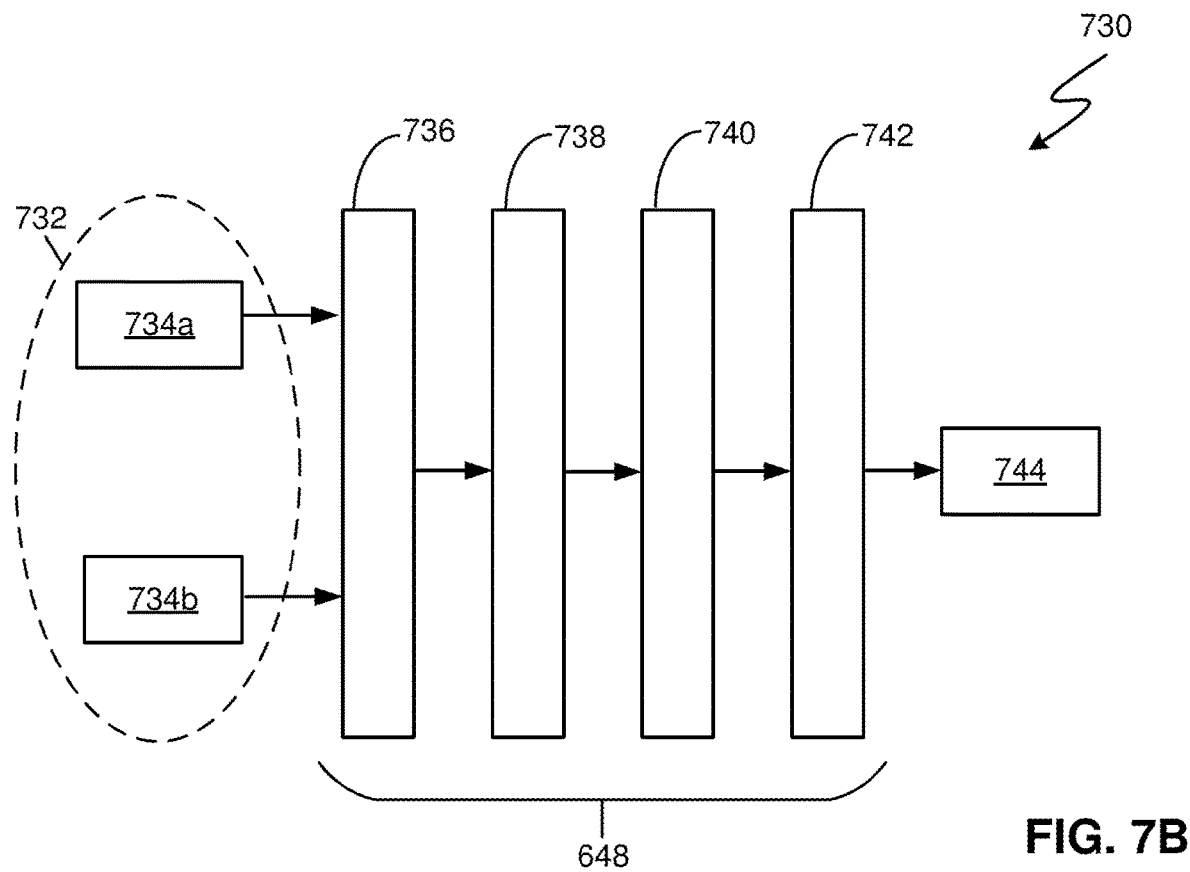
FIG. 7B illustrates training of a classifier according to at least one embodiment that is used in the process for building a concreteness conversion generator shown in FIG. 6A.

FIG. 7B illustrates classifier training 730 to illustrate aspects of step 608 for training a classifier 648 for subsequent use in training the concreteness level conversion generator 150. Classifier training input 732 includes classifier first and second training sentences 734a, 734b, respectively, which may be the same, from the same semantic category, or from a different semantic category. In at least some embodiments, the classifier 648 includes first, second, third, and fourth layer groupings 736, 738, 740, and 742, respectively. The first layer grouping 736 receives the classifier training input 732 and treats the classifier first and second training sentences 734a, 734b as one concatenated long sequence. The first layer grouping 736 takes in the concatenated long sequence of words one after another and then provides as its output a representation of each word sequentially into the second layer grouping 738. The second layer grouping 738 provides as the output of its last hidden state to the third layer grouping 740. The third layer grouping 740 provides its output to the fourth layer grouping 742. The fourth layer grouping 742 provides its output as the classifier output 744 which is a classification of whether the classifier first and second training sentences 734a, 734b are from same or different semantic categories. The first layer grouping 736 in at least some embodiments is a text-based language transformer deep learning model (e.g., a BERT language model) in which every output element is connected to every input element, and the weightings between the elements are dynamically calculated based upon their connection. The second layer grouping 738 in at least some embodiments may include long short-term memory (LTSM). The third layer grouping 740 may be a fully connected layer. The fourth layer grouping 742 may be a softmax layer which computes the output of the third layer grouping 740 to obtain the final output of the classifier 648. The softmax layer produces a probability distribution of the classes, and the highest probability distribution of the two options is selected as the classifier output 744. The final output is the classifier output 744 which is a binary classification of semantic similarity or semantic dissimilarity. In at least some embodiments, the first layer grouping 736 may be retrieve in a pre-trained state so that the classifier training 730 illustrated in FIG. 7B trains and adjusts parameters of the second, third, and fourth layer groupings 738, 740, and 742, respectively, and not of the first layer grouping 736.

In step 610 of the concreteness conversion generator building process 600 shown in FIG. 6A, a new sentence is generated with the generator by using a source sentence. As shown in the pipeline 630 of FIG. 6B, the source sentence 632 is input into the encoder 634 which as output provides a multi-dimensional vector that represents the source sentence 632. The source sentence 632 belongs to a random semantic category from training text data. The multi-dimensional vector is input into the generator 638. A training target concreteness level 636 is also input as a one-hot encoding vector into the generator 638. The training task illustrated for the pipeline 630 of FIG. 6B is for the generator 638 to produce a sentence which has the same general meaning as the source sentence 632 but with a modified concreteness level to match the target concreteness level 636. The generator 638 is a machine learning model that produces text as output and in at least some embodiments includes long short-term memory (LSTM). Step 610 is also illustrated in first pipeline segment 802 shown in pipeline segment first view 800 of FIG. 8A. There, the generator 638 is shown as producing a new sentence 642. The generator 638 concatenates together, for its initial hidden state, the two inputs of the output of the last hidden state of the encoder 634 and the one-hot encoding vector which represents the training target concreteness level 636. In order to generate the new sentence 642, the generator 638 samples existing words that are represented as one-hot encoding vectors.

Figure 8A:
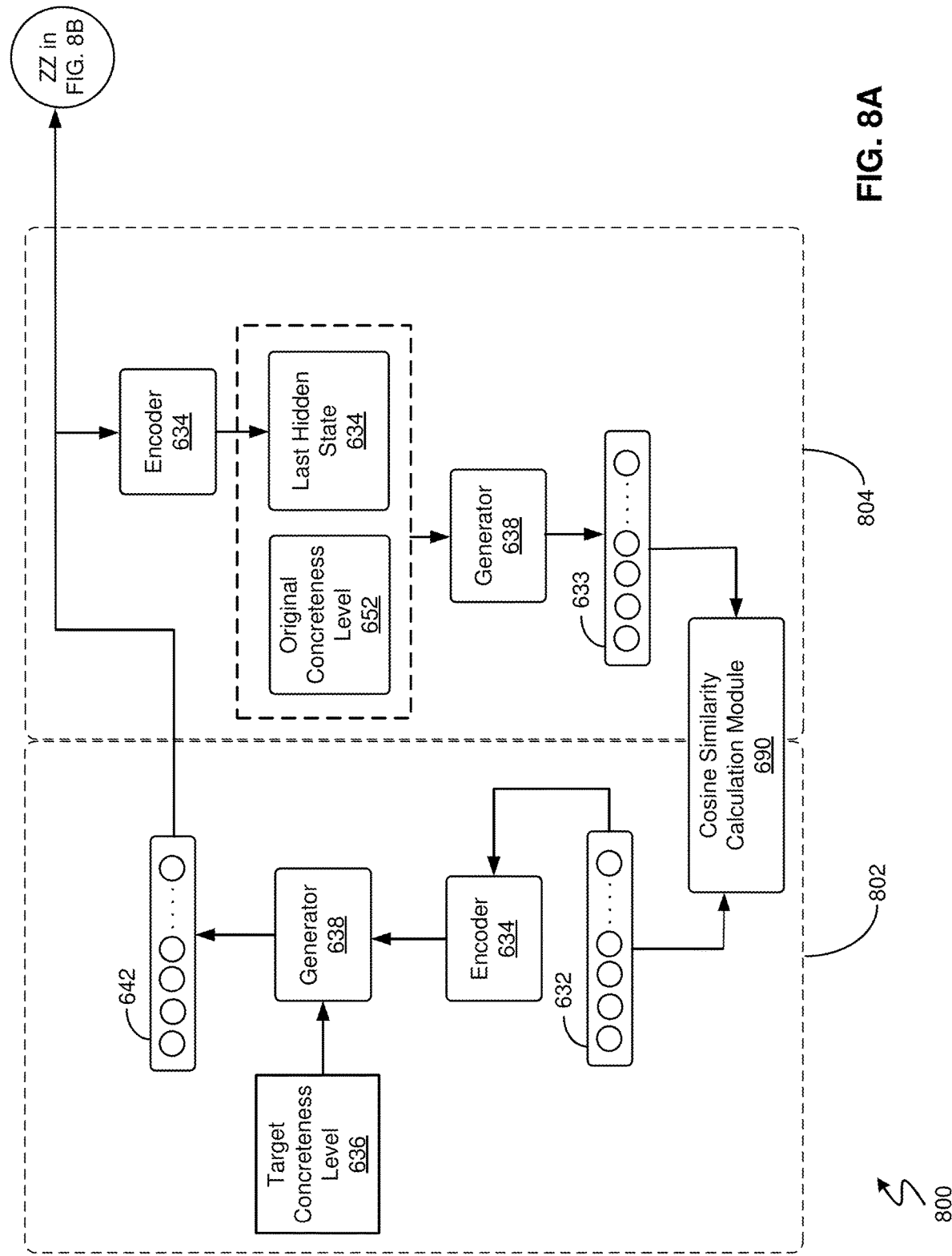
FIG. 8A illustrates detailed aspects according to at least one embodiment of the pipeline for building a concreteness conversion generator shown in FIG. 6B.

In step 612 of the concreteness conversion generator building process 600 shown in FIG. 6A, the source sentence is reconstructed with the generator and by using the new sentence, the original concreteness level (i.e., the concreteness level of the source sentence 632), and output from the encoder. The second pipeline segment 804 shown in pipeline segment first view 800 of FIG. 8A shows an illustration of step 612 including the reconstructed sentence 633 that is generated by the generator 638 in attempt to exactly match the source sentence 632. The generator 638 uses the new sentence 642 (or more particularly a multi-dimensional vector representing the new sentence 642, which is produced by the encoder 634) and the original concreteness level 652 (represented as a one-hot encoding vector) of the source sentence 632 as inputs to attempt to make the reconstructed sentence 633 exactly match the source sentence 632. The cosine similarity calculation module 890 shown in FIG. 8A and which is part of the concreteness analysis and conversion recommendation program 916 calculates the cosine similarity between the multi-dimensional vectors representing the reconstructed sentence 633 and the source sentence 632. This cosine similarity is used in the action-value function described below, where the cosine similarity between the source sentence and the reconstructed sentence is a reward.

Figure 8B:
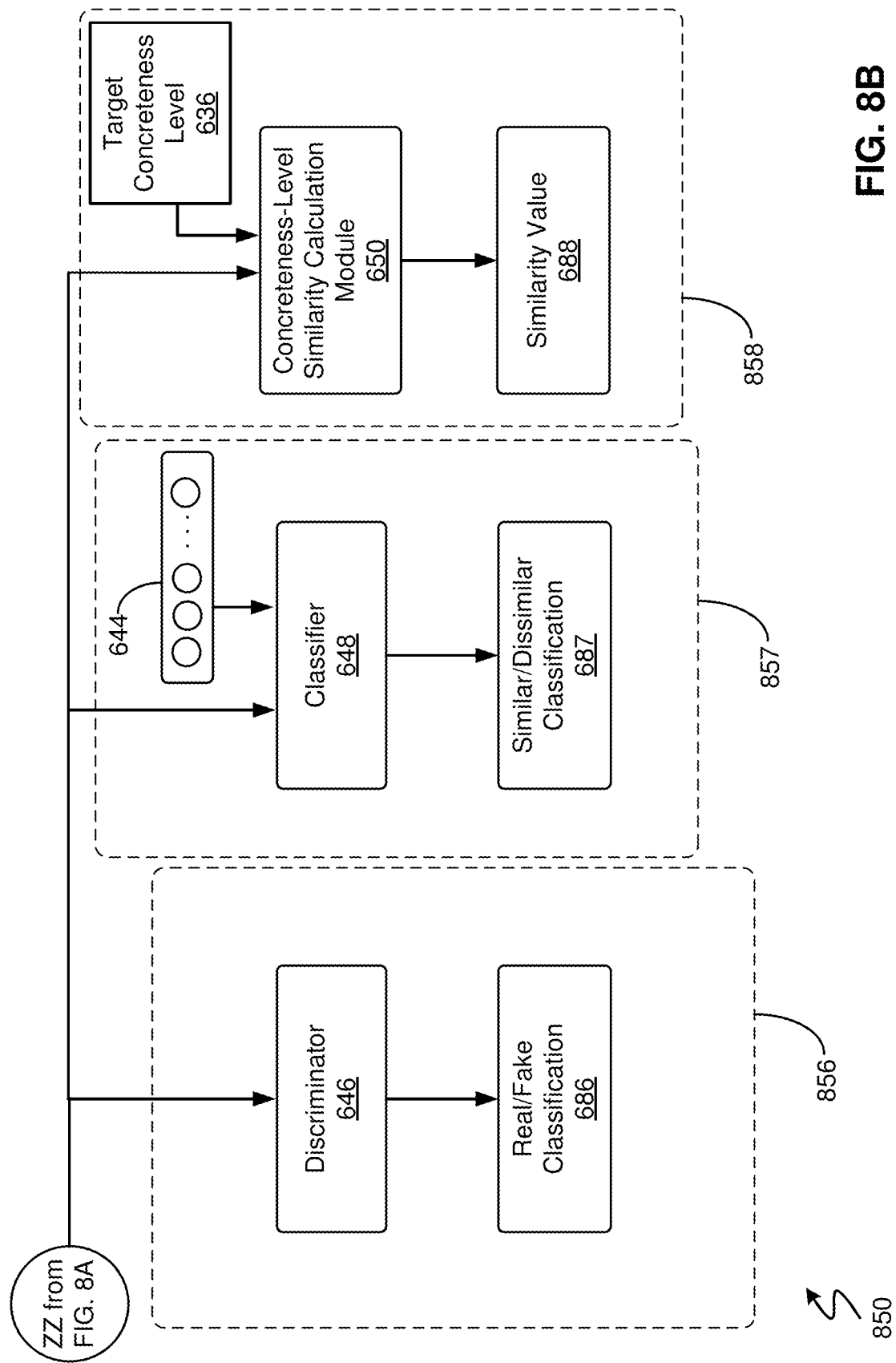
FIG. 8B illustrates further detailed aspects according to at least one embodiment of the pipeline for building a concreteness conversion generator shown in FIG. 6B.

In step 614 of the concreteness conversion generator building process 600 shown in FIG. 6A, an attempt is made to fool the discriminator with the new sentence. The third pipeline segment 856 shown in pipeline segment second view 850 of FIG. 8B shows an illustration of step 614 including the new sentence 642 that was generated by the generator 638 being input as a fake sentence into the discriminator 646. In at least some embodiments, the discriminator 646 uses a convolutional neural network with a highway structure to attempt to produce as a binary output classification whether the new sentence 642 is a real/fake classification 686. The generator 638 tries to generate sentences that the discriminator 646 cannot distinguish from the original sentences.

In step 616 of the concreteness conversion generator building process 600 shown in FIG. 6A, the new sentence and a real sentence with the target concreteness level are fed to the classifier to attempt to generate same semantic classification. The training of this classifier 648 was described above with respect to the description of FIG. 7B. The fourth pipeline segment 857 shown in pipeline segment second view 850 of FIG. 8B shows an illustration of step 616 including the new sentence 642 that was generated by the generator 638 being input as a fake sentence. Another real sentence 644 with the target concreteness level 636 is also input into the classifier 648. The generator 638 tries to generate sentences that can be identified by the classifier 648 to express the same general meaning semantically as a real sentence with the target concreteness level from the training text data set. The output of the classifier 648 is shown in FIG. 8B as similar/dissimilar classification 687.

In step 618 of the concreteness conversion generator building process 600 shown in FIG. 6A, the new sentence and the target concreteness level are fed to a similarity calculation module to generate a similarity value. The fifth pipeline segment 858 shown in pipeline segment second view 850 of FIG. 8B shows an illustration of step 618 including the concreteness-level similarity calculation module 650 which produces a similarity value 688. The concreteness-level similarity calculation module 650 may pass the new sentence 642 through a pre-built concreteness-level classification tree of the identified semantic category of the new sentence. The generator 638 tries to generate each sentence with the highest probability value of belonging to the target concreteness level as determined by the concreteness-level similarity calculation module 650.

The concreteness-level similarity calculation module 650 receives, as input, the target concreteness level and the generated sentence from the generator as two inputs, and then uses the related concreteness-level classification tree to obtain the probability value (as resulting similarity value 688) that the new sentence 642 belongs to the target concreteness level 636. For example, the concreteness-level trees shown in FIGS. 2A and 2B are used and the target concreteness level 636 is assumed to be "CL #2" shown in FIG. 4. The new sentence 642 is passed through the corresponding trained LDA model associated with the root node concreteness level-word probability matrix 202 to determine the two probabilities that the new sentence belongs to the two latent concreteness levels at the root node concreteness level-word probability matrix 202, respectively. These two probability values are called $p_1$ (corresponding to "CL #1" shown in FIG. 4) and $p_2$. Then, the new sentence 642 is passed through the corresponding trained LDA model of the first lower level node 206 to determine the two probabilities that the new sentence belongs to the two latent concreteness levels at the first lower level node 206, respectively. These two additional probability values are called $p_3$ (corresponding to "CL #2" shown in FIG. 4) and $p_4$ (corresponding to "CL #3" shown in FIG. 4) respectively. The final probability that the new sentence 642 belongs to the target concreteness level 636 is equal to the multiplication of $p_2$ and $p_3$.

In each of the generator-related steps of the pipeline shown in FIGS. 6B, 8A, and 8B, a policy gradient is used to update the parameters of the generator 638. In each discriminator step of the pipeline shown in FIGS. 6B, 8A, and 8B, the current generator 638 is used to generate fake sentences which are combined with real sentences from the training data set to minimize the cross entropy for the discriminator 646. The encoder 634 is involved in both generator-related steps and discriminator-related steps to encode input sentences and to deliver its last hidden states.

In step 620 of the concreteness conversion generator building process 600 shown in FIG. 6A, a determination is made whether the performance of the generator has converged. If the determination of step 620 is affirmative and the performance has converged, then the concreteness conversion generator building process 600 may end with the concreteness conversion generator ready to be implemented for concreteness conversion such as in the process 100 shown in FIGS. 1A and 1*n* the pipeline 140 shown in FIG. 1B. If the determination of step 620 is negative and the performance has not converged, then the concreteness conversion generator building process 600 returns to step 610 for a repeat of steps 610, 612, 614, 616, and 618 to improve the concreteness conversion generator until its performance converges. The performance converges when the output moves closer and closer to a specific value of success.

Figure 6D:
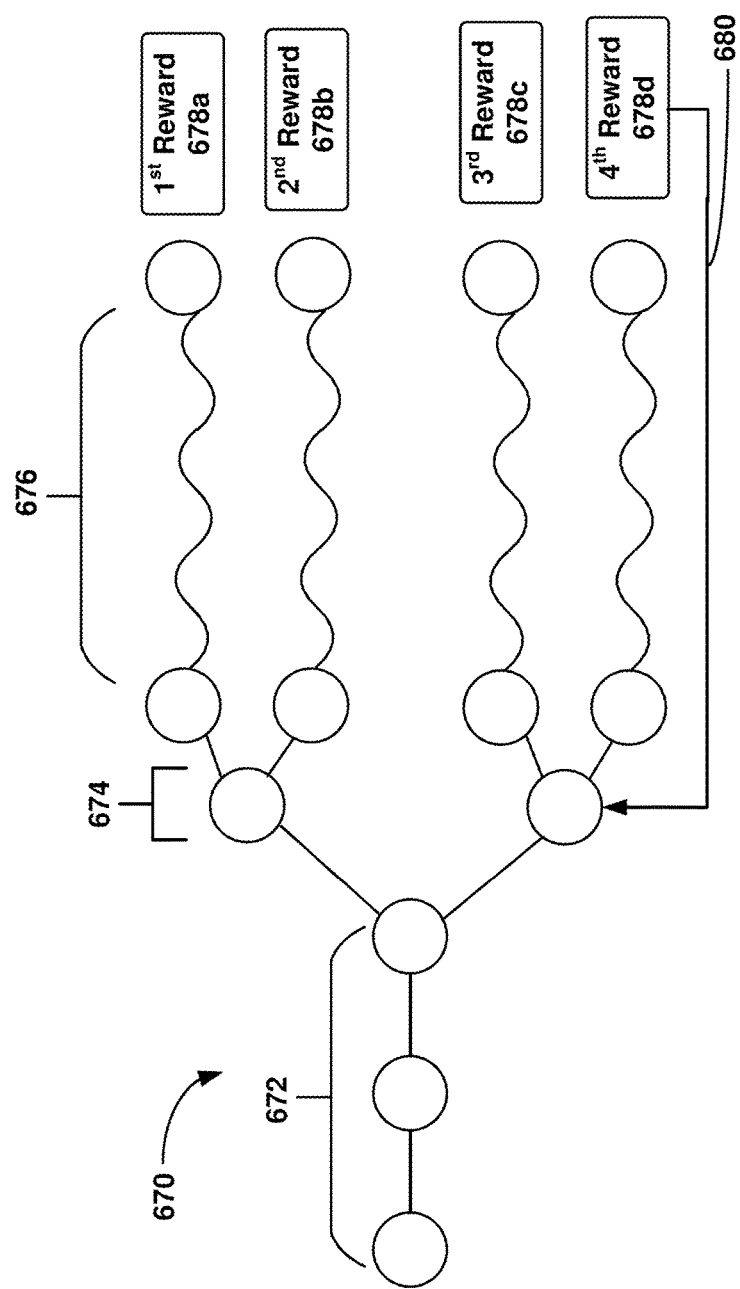
FIG. 6D illustrates a policy gradient according to at least one embodiment for helping train a concreteness conversion generator that is implemented in the automated concreteness conversion process and pipeline shown in FIGS. 1A and 1B.

FIG. 6D illustrates a policy gradient pipeline 670 which illustrates how a policy gradient 680 may be implemented for training the generator 638 according to at least one embodiment. In the policy gradient pipeline 670, the state 672 leads to a next action 674. The next action 674 leads to a Monte Carlo search 676. The Monte Carlo search 676 results in generating first, second, third, and fourth rewards 678a, 678b, 678c, and 678d, respectively. The first, second, third, and fourth rewards 678a, 678b, 678c, and 678d are fed back through the policy gradient 680.

During the adversarial training, the concreteness conversion generator 638 is trained by policy gradient where the final reward signal is provided by multiple providers including the discriminator 646, the classifier 648, the concreteness-level similarity calculation module 650, and the cosine similarity calculation module 690 shown in FIG. 8A. The final reward signal is passed back to the intermediate action value via Monte Carlo search. FIG. 8C shows an action-value function 890 of a sequence used for training the concreteness conversion generator 638. With the action-value function 890 shown in FIG. 8C:

$D_\phi(Y_{1:T}^n)$ is the estimated probability of being real by the discriminator 646 as the reward;

$C_\varphi(Y_{1:T}^n, \mathbb{s})$ is the estimated probability of being similar semantic by the classifier 648 as the reward, wherein $\mathbb{s}$ indicates a real sentence with the target concreteness level 636 from the training data set;

$\text{Cosine}(G_\theta(Y_{1:T}^n), \mathbb{s}_{src})$ is the cosine similarity between the source sentence and the reconstructed source sentence as the reward, wherein the term $G_\theta(Y_{1:T}^n)$ indicates a reconstructed source sentence by the generator and $\mathbb{s}_{src}$ indicates a source sentence inputted into the encoder. One-hot encoding vectors of all words in the source sentence and the reconstructed sentence are concatenated as two long vectors respectively before calculating cosine value;

$\mathbb{I}(Y_{1:T}^n, \mathcal{M})$ is the similarity value calculated by the concreteness-level similarity calculation module as the reward, wherein $\mathbb{I}$ indicates a target concreteness level;

T is a preset maximum length of generated sentences from the generator 638; and $\lambda_1$, $\lambda_2$, $\lambda_3$ and $\lambda_4$ are hyper-parameters that control the relative importance of factors respectively, and $\lambda_1+\lambda_2+\lambda_3+\lambda_4=1$. In at least some embodiments, $\lambda_1=0.2$, $\lambda_2=0.3$, $\lambda_3=0.1$ and $\lambda_4=0.4$.

It may be appreciated that FIGS. 1A-8B provide only illustrations of certain embodiments and do not imply any limitations with regard to how different embodiments may be implemented. Many modifications to the depicted embodiment(s), e.g., to the particular machine learning models that are depicted, may be made based on design and implementation requirements.

In one example of the process 100, the program 916 analyzed for concreteness level evaluation and uniformization the following text document that was received:

The Micro Service to be Implemented Requires the Following REST APIs:

1) One REST API takes in an image which contains an English sentence. The API extracts text from the input image by using OCR Tool named 'tesseract'. The API records the extracted text onto the central storage server. This API is required to respond within one second.

2) One REST API takes in a user account Id. The API queries the task data that are created by the user specified by the input user account Id from within the task-data storage server. The API returns the queried task data back to the user's client. This API is required to respond within two seconds.

3) One REST API takes in as input an image of UI element whose caption can be different languages. The API obtains text in the image. The API records the extracted text onto the central storage server. API response is required to be fast enough.

The semantic classifier determined that the last sentence of each of these three sections 1), 2), and 3) is from the same semantic category "48". Of these last sentences, the program 916 determined that the first two had a concreteness level 3 and the last one had a concreteness level 1. In response, the program 916 generates a proposed sentence change for the last one to better match the concreteness level (3) of the first two last sentences. The sentence change proposal may be generated with a placeholder that indicates that the user should find out and enter the specific response time of the API as indicated in seconds.

The semantic classifier also determined that the second sentence of the first group and the second sentence of the third group are both from the same semantic category "12". Of these two sentences, the program 916 determined that the first one had a concreteness level 2 and the second one had a concreteness level 1. In response, the program 916 analyzes user settings to determine if the user has set a concreteness level preference. If none was set, the program 916 may automatically, based on a variety of factors, make a sentence change proposal for the first one to remove detail or make a sentence change proposal for the second one to increase detail.

In the example above, no sentence change proposal for concreteness modification was generated for the other sentences because these sentences were all determined as being from a respective unique semantic category. In other embodiments, a sentence change proposal for concreteness modification may be generated for each sentence or for any sentence with a concreteness level that is lower than a predetermined threshold. For example, the first sentence of that first section and the first sentence of the second section were both found to have a concreteness level of 2. Thus, in an embodiment where the concreteness level threshold is 3 the program 916 would also generate sentence change proposals to increase the detail level for these sentences. The other sentences not discussed were determined as already having a concreteness level threshold of three or higher.

In at least some embodiments, if a document is being analyzed compared to itself without reference to other historical documents, if a sentence is found with a unique semantic category compared to the semantic categories of other sentences of the document then the program 916 does not generate any concreteness conversion sentence change proposal for that sentence. In other embodiments with historical documents used for generating the concreteness classification tree and the training of the generator, other sentences from the historical documents may be used to find a majority concreteness level for a particular semantic category.

In some embodiments based on a single (currently edited) document and the classification tree that was not trained with other historical documents, in one instance a writer expects all sentences in a document to be more detailed and indicates same in the program 916. The program 916 in response automatically generates a sentence change proposal with higher concreteness for each original sentence, although those original sentences belong to different semantic categories. For another embodiment without the tree training with historical documents, the document may be made from an analysis in which web-crawling is performed by the program 916 or another computer program to retrieve sentences from the internet and combine them into a document. The program 916 could use the process 100 to perform concreteness uniformization for all of the retrieved sentences as part of pre-processing of the document based on using sentences from the same semantic categories, using an automatically selected concreteness level for all sentences, or by using a user manually preset concreteness level for all sentences.

Preferred machine learning models were described for implementation for the concreteness-level identification and improvement. In other embodiments, other machine learning models may be implemented for one or more of the training and/or prediction steps described above in the various embodiments. Such alternative machine learning models may include naive Bayes models, random decision tree models, linear statistical query models, logistic regression n models, neural network models, e.g. convolutional neural networks, multilayer perceptrons, residual networks, long short-term memory architectures, algorithms, deep learning models, deep learning generative models, and other models. Training data should include targets or target attributes which include a correct answer. The learning algorithm finds patterns in input data in order to map the input data attributes to the target. The machine learning models contain these patterns so that the answer can be predicted for similar future inputs. A machine learning model may be used to obtain predictions on new input text. The machine learning model uses the patterns that are identified to determine what the appropriate concreteness level and concreteness conversion are. Training may include supervised and/or unsupervised learning.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 900 contains an example of an environment for the execution of at least some of the computer code involved in performing the inventive methods, such as concreteness analysis and conversion recommendation program 916. In addition to concreteness analysis and conversion recommendation program 916, computing environment 900 includes, for example, computer 901, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and concreteness analysis and conversion recommendation program 916, as identified above), peripheral device set 914 (including user interface (UI) device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

COMPUTER 901 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method may be distributed among multiple computers and/or between multiple locations. On the other hand, in this presentation of computing environment 900, detailed discussion is focused on a single computer, specifically computer 901, to keep the presentation as simple as possible. Computer 901 may be located in a cloud, even though it is not shown in a cloud in FIG. 1. On the other hand, computer 901 is not required to be in a cloud except to any extent as may be affirmatively indicated.

PROCESSOR SET 910 includes one, or more, computer processors of any type now known or to be developed in the future. Processing circuitry 920 may be distributed over multiple packages, for example, multiple, coordinated integrated circuit chips. Processing circuitry 920 may implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set may be located "off chip."

In some computing environments, processor set 910 may be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods may be stored in concreteness analysis and conversion recommendation program 916 in persistent storage 913.

COMMUNICATION FABRIC 911 is the signal conduction path that allows the various components of computer 901 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 912 is any type of volatile memory now known or to be developed in the future. Examples include dynamic type random access memory (RAM) or static type RAM. Typically, volatile memory 912 is characterized by random access, but this is not required unless affirmatively indicated. In computer 901, the volatile memory 912 is located in a single package and is internal to computer 901, but, alternatively or additionally, the volatile memory may be distributed over multiple packages and/or located externally with respect to computer 901.

PERSISTENT STORAGE 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 may be a read only memory (ROM), but typically at least a portion of the persistent storage allows writing of data, deletion of data and re-writing of data. Some familiar forms of persistent storage include magnetic disks and solid state storage devices. Operating system 922 may take several forms, such as various known proprietary operating systems or open source Portable Operating System Interface-type operating systems that employ a kernel. The code included in concreteness analysis and conversion recommendation program 916 typically includes at least some of the computer code involved in performing the inventive methods.

PERIPHERAL DEVICE SET 914 includes the set of peripheral devices of computer 901. Data communication connections between the peripheral devices and the other components of computer 901 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 923 may include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 may be persistent and/or volatile. In some embodiments, storage 924 may take the form of a quantum computing storage device for storing data in the form of qubits. In embodiments where computer 901 is required to have a large amount of storage (for example, where computer 901 locally stores and manages a large database) then this storage may be provided by peripheral storage devices designed for storing exceptionally large amounts of data, such as a storage area network (SAN) that is shared by multiple, geographically distributed computers. IoT sensor set 925 is made up of sensors that can be used in Internet of Things applications. For example, one sensor may be a thermometer and another sensor may be a motion detector.

NETWORK MODULE 915 is the collection of computer software, hardware, and firmware that allows computer 901 to communicate with other computers through WAN 902. Network module 915 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN 902 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 903 is any computer system that is used and controlled by an end user (for example, a customer of an enterprise that operates computer 901) and may take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 may be a client device, such as thin client, heavy client, mainframe computer, desktop computer and so on.

REMOTE SERVER 904 is any computer system that serves at least some data and/or functionality to computer 901. Remote server 904 may be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data may be provided to computer 901 from remote database 930 of remote server 904.

PUBLIC CLOUD 905 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs may be stored as images and may be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware, and firmware that allows public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares. CPU power, and quantifiable hardware capabilities. However, programs running inside a container can only use the contents of the container and devices assigned to the container, a feature which is known as containerization.

PRIVATE CLOUD 906 is similar to public cloud 905, except that the computing resources are only available for use by a single enterprise. While private cloud 906 is depicted as being in communication with WAN 902, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 905 and private cloud 906 are both part of a larger hybrid cloud.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The flowchart and block diagrams in the Figures illustrate the architecture, functionality, and operation of possible implementations of systems, methods, and computer program products according to various embodiments. In this regard, each block in the flowchart, pipeline, and/or block diagrams may represent a module, segment, or portion of instructions, which comprises one or more executable instructions for implementing the specified logical function(s).

What is claimed is:

1. A method comprising:
   training a machine learning model to generate revised sentences with revised concreteness levels, wherein the training comprises:
      submitting a revised sentence generated by the machine learning model and another real sentence into a classifier, the other real sentence having a target concreteness level,
      the classifier comparing the revised sentence to the other real sentence and, in response, producing a similarity classification,
      submitting the revised sentence generated by the machine learning model and another fake sentence into a discriminator,
      the discriminator comparing the revised sentence and the fake sentence and, in response, producing a real/fake classification, and
      updating parameters of the machine learning model based on the similarity classification and based on the real/fake classification;
   building a concreteness-level classification tree via a computer performing concreteness level iterative continuous dichotomy of multiple sentences of a sample text corpus to determine a total number of concreteness levels corresponding to a respective semantic category;
   determining, via the computer performing natural language processing, a concreteness level of a first individual sentence of a text corpus, wherein the determining comprises the computer passing the first individual sentence through the concreteness-level classification tree;
generating, via the computer and based on the natural language processing, a proposed change of the first individual sentence, the first individual sentence with the proposed change having a modified concreteness level and preserving a general meaning of the first individual sentence, wherein the generating the proposed change of the first individual sentence comprises inputting the first individual sentence and a target concreteness level into the trained machine learning model and, in response, receiving the proposed change as output of the trained machine learning model; and
transmitting, via the computer, the proposed change for presentation of the proposed change.

2. The method of claim 1, wherein the modified concreteness level has increased concreteness compared to the concreteness level and improves a concreteness uniformization of the text corpus.

3. The method of claim 1, wherein the modified concreteness level has decreased concreteness compared to the concreteness level and improves a concreteness uniformization of the text corpus.

4. The method of claim 1, further comprising refining the concreteness-level classification tree via the computer performing concreteness level iterative continuous dichotomy of multiple sentences of the text corpus to redetermine the total number of concreteness levels corresponding to the respective semantic category.

5. The method of claim 1, wherein the building of the concreteness-level classification tree further occurs via the computer iteratively performing concreteness level continuous dichotomy of multiple sentences of another text corpus.

6. The method of claim 1, further comprising:
performing, via the computer, generative statistical modeling on the sample text corpus to determine a total number of semantic categories of sentences of the sample text corpus.

7. The method of claim 6, wherein the performing of the generative statistical modeling on the sample text corpus to determine the total number of the semantic categories of the sentences of the sample text corpus comprises identifying topics amongst the sample text corpus and certain semantic categories within a respective topic of the identified topics.

8. The method of claim 6, wherein the passing of the individual sentence through the concreteness-level classification tree comprises submitting the individual sentence to a first generative statistical model assigned to a root node of the concreteness-level classification tree so that the first generative statistical model produces as output a link to one of multiple lower level nodes of the concreteness-level classification tree.

9. The method of claim 8, wherein the passing of the individual sentence through the concreteness-level classification tree continues until the individual sentence is inferred as belonging to a concreteness level associated with a leaf node of the concreteness-level classification tree.

10. The method of claim 6, wherein the proposed change is based on a target concreteness level that is determined by a majority concreteness level for sentences in the respective semantic category.

11. The method of claim 6, wherein the generative statistical modeling is also performed on another text corpus to determine the total number of the semantic categories; and wherein the building of the concreteness-level classification tree also occurs via the computer performing the concreteness level continuous dichotomy on the sentences of the other text corpus to redetermine the total number of concreteness levels corresponding to the respective semantic category of the determined semantic categories.

12. The method of claim 11, wherein the proposed change is based on a target concreteness level that is determined by a majority concreteness level for sentences in the respective semantic category.

13. The method of claim 1, wherein the concreteness-level classification tree comprises a root node and at least two leaf nodes and a number of the concreteness levels corresponds to a total number of the at least two leaf nodes.

14. The method of claim 1, wherein the concreteness-level classification tree comprises multiple nodes and multiple generative statistical models respectively associated with the multiple nodes.

15. The method of claim 1, wherein the machine learning model was further trained with a cosine similarity calculation module and a concreteness-level similarity calculation module that calculates a probability value that a generated sentence belongs to a targeted concreteness level.

16. A computer system comprising:
one or more processors, one or more computer-readable memories, and program instructions stored on at least one of the one or more computer-readable memories for execution by at least one of the one or more processors to cause the computer system to:
train a machine learning model to generate revised sentences with revised concreteness levels, wherein the training comprises:
submitting a revised sentence generated by the machine learning model and another real sentence into a classifier, the other real sentence having a target concreteness level,
the classifier comparing the revised sentence to the other real sentence and, in response, producing a similarity classification,
submitting the revised sentence generated by the machine learning model and another fake sentence into a discriminator,
the discriminator comparing the revised sentence and the fake sentence and, in response, producing a real/fake classification, and
updating parameters of the machine learning model based on the similarity classification and based on the real/fake classification;
build a concreteness-level classification tree via performing concreteness level iterative continuous dichotomy of multiple sentences of a sample text corpus to determine a total number of concreteness levels corresponding to a respective semantic category;
determine, via natural language processing, a concreteness level of a first individual sentence of a text corpus, wherein the determining comprises passing the first individual sentence through the concreteness-level classification tree;
generate, based on the natural language processing, a proposed change of the first individual sentence, the first individual sentence with the proposed change comprising a modified concreteness level and preserving a general meaning of the first individual sentence, wherein the generating the proposed change of the first individual sentence comprises inputting the first individual sentence and a target concreteness level into the trained machine learning model and, in response, receiving the proposed change as output of the trained machine learning model; and transmit the proposed change for presentation of the proposed change.

17. A computer program product comprising a computer-readable storage medium having program instructions embodied therewith, wherein the program instructions are executable by a computer to cause the computer to:

train a machine learning model to generate revised sentences with revised concreteness levels, wherein the training comprises:

submitting a revised sentence generated by the machine learning model and another real sentence into a classifier, the other real sentence having a target concreteness level, the classifier comparing the revised sentence to the other real sentence and, in response, producing a similarity classification, submitting the revised sentence generated by the machine learning model and another fake sentence into a discriminator, the discriminator comparing the revised sentence and the fake sentence and, in response, producing a real/fake classification, and updating parameters of the machine learning model based on the similarity classification and based on the real/fake classification;

build a concreteness-level classification tree via performing concreteness level iterative continuous dichotomy of multiple sentences of a sample text corpus to determine a total number of concreteness levels corresponding to a respective semantic category;

determine, via natural language processing, a concreteness level of a first individual sentence of a text corpus, wherein the determining comprises passing the first individual sentence through the concreteness-level classification tree;

generate, based on the natural language processing, a proposed change of the first individual sentence, the first individual sentence with the proposed change comprising a modified concreteness level and preserving a general meaning of the first individual sentence, wherein the generating the proposed change of the first individual sentence comprises inputting the first individual sentence and a target concreteness level into the trained machine learning model and, in response, receiving the proposed change as output of the trained machine learning model; and transmit the proposed change for presentation of the proposed change.

18. The computer program product of claim 17, wherein the modified concreteness level has increased concreteness compared to the concreteness level and improves a concreteness uniformization of the text corpus.

19. The computer program product of claim 17, wherein the modified concreteness level has decreased concreteness compared to the concreteness level and improves a concreteness uniformization of the text corpus.

20. The computer program product of claim 17, wherein the program instructions further comprise program instructions executable by the computer to cause the computer to refine the concreteness-level classification tree via performing concreteness level iterative continuous dichotomy of multiple sentences of the text corpus to redetermine the total number of concreteness levels corresponding to the respective semantic category.

* * * * *